(12) United States Patent
Chattin et al.

(10) Patent No.: US 7,959,499 B2
(45) Date of Patent: Jun. 14, 2011

(54) MACHINE FOR LUNG REMOVAL IN POULTRY AND METHOD AND USE THEREOF

(75) Inventors: Johnny Allen Chattin, Dahlonega, GA (US); Scott L. Davis, Dahlonega, GA (US)

(73) Assignee: Davis Poultry Equipment, Inc., Dawsonville, GA (US)

( * ) Notice: Subject to any disclaimer, the term of this patent is extended or adjusted under 35 U.S.C. 154(b) by 204 days.

(21) Appl. No.: 12/321,754

(22) Filed: Jan. 23, 2009

(65) Prior Publication Data

US 2009/0203303 A1    Aug. 13, 2009

Related U.S. Application Data

(60) Provisional application No. 61/022,923, filed on Jan. 23, 2008.

(51) Int. Cl.
*A22B 5/16*    (2006.01)
(52) U.S. Cl. .......................................................... 452/116
(58) Field of Classification Search .................. 452/106, 452/107, 111, 115, 118, 123, 134, 160
See application file for complete search history.

(56) References Cited

U.S. PATENT DOCUMENTS

| | | | |
|---|---|---|---|
| 3,802,028 A | | 4/1974 | Scheler et al. |
| 3,806,988 A | * | 4/1974 | Harben, Jr. .................... 452/118 |
| 3,986,231 A | * | 10/1976 | Harben, Jr. .................... 452/118 |
| 3,992,752 A | | 11/1976 | Harben, Jr. et al. |
| 4,004,320 A | * | 1/1977 | Scheier et al. ................ 452/116 |
| 4,024,603 A | * | 5/1977 | Harben et al. ................ 452/116 |
| 4,114,239 A | * | 9/1978 | McClelland .................. 452/116 |
| 4,516,290 A | | 5/1985 | van Mil |
| 4,918,787 A | * | 4/1990 | Hazenbroek .................. 452/116 |
| 5,135,431 A | * | 8/1992 | van den Nieuwelaar et al. ............................. 452/116 |
| 5,167,568 A | * | 12/1992 | Esbroeck et al. ............. 452/116 |
| 5,873,774 A | * | 2/1999 | Tieleman et al. ............. 452/116 |
| 6,027,403 A | * | 2/2000 | Hazenbroek et al. ......... 452/117 |
| 6,165,062 A | * | 12/2000 | Martin et al. ................. 452/116 |
| 6,176,772 B1 | * | 1/2001 | Hazenbroek et al. ......... 452/117 |
| 6,227,960 B1 | * | 5/2001 | Martin et al. ................. 452/118 |

\* cited by examiner

*Primary Examiner* — Thomas Price
(74) *Attorney, Agent, or Firm* — Alston & Bird LLP

(57) ABSTRACT

Provided is poultry processing equipment and more particularly, an improved evisceration device and subassemblies thereof for removing organs from a membrane-covered socket in the body cavity of a poultry carcass, such as the lungs.

21 Claims, 20 Drawing Sheets

Fig. 12 Valve Manifold 240
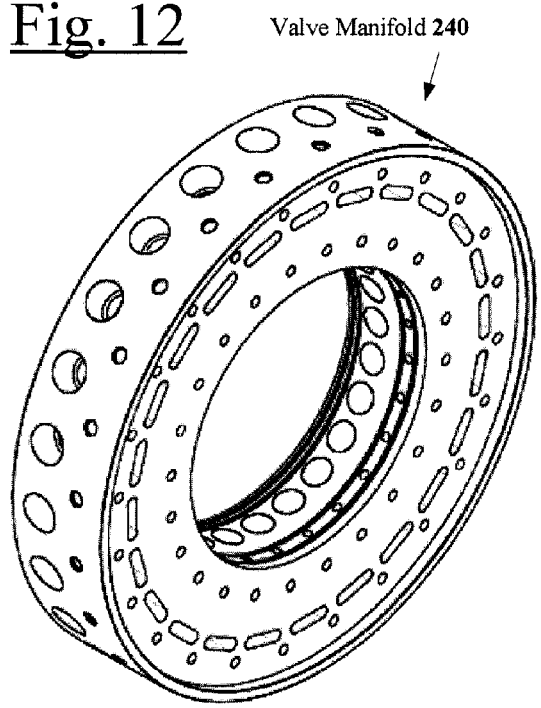
Fig. 14 Valve Manifold 240
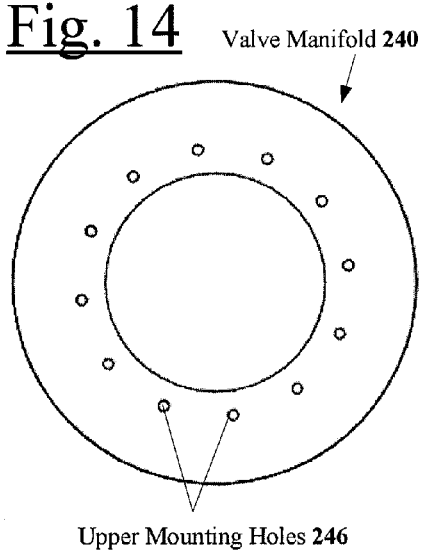
Upper Mounting Holes 246
Fig. 13
Vacuum Bores 242
Liquid Bores 244
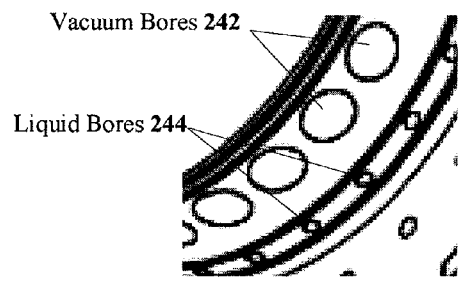
Fig. 15 Valve Manifold 240
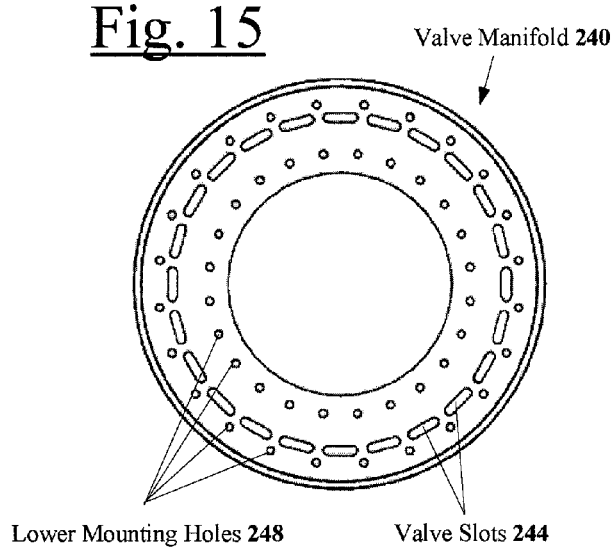
Lower Mounting Holes 248    Valve Slots 244

Valve Manifold Connector Plate 260 (isolated top plan and perspective views)

Plate Mounting Holes 264
Valve Clearance Slots 261
Valve Mounting Holes 262

(3 positions)

(Bottom)

(Top)

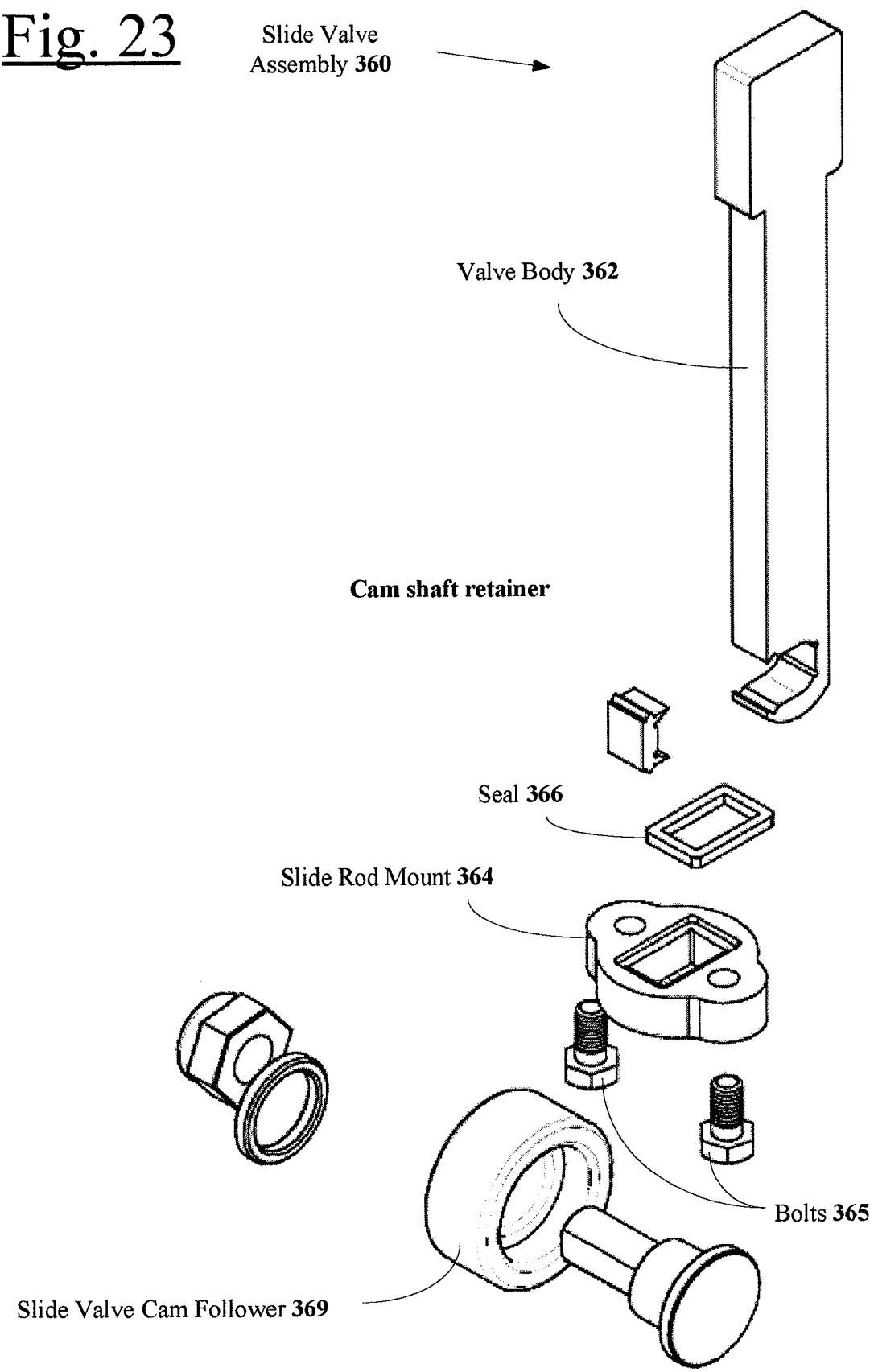

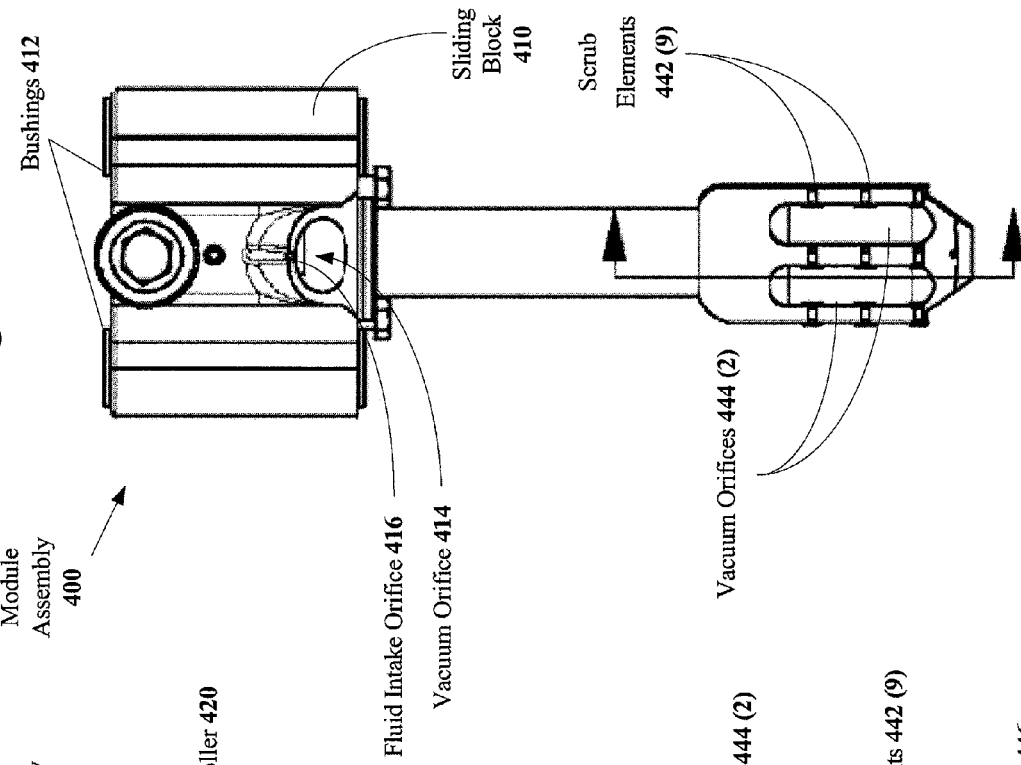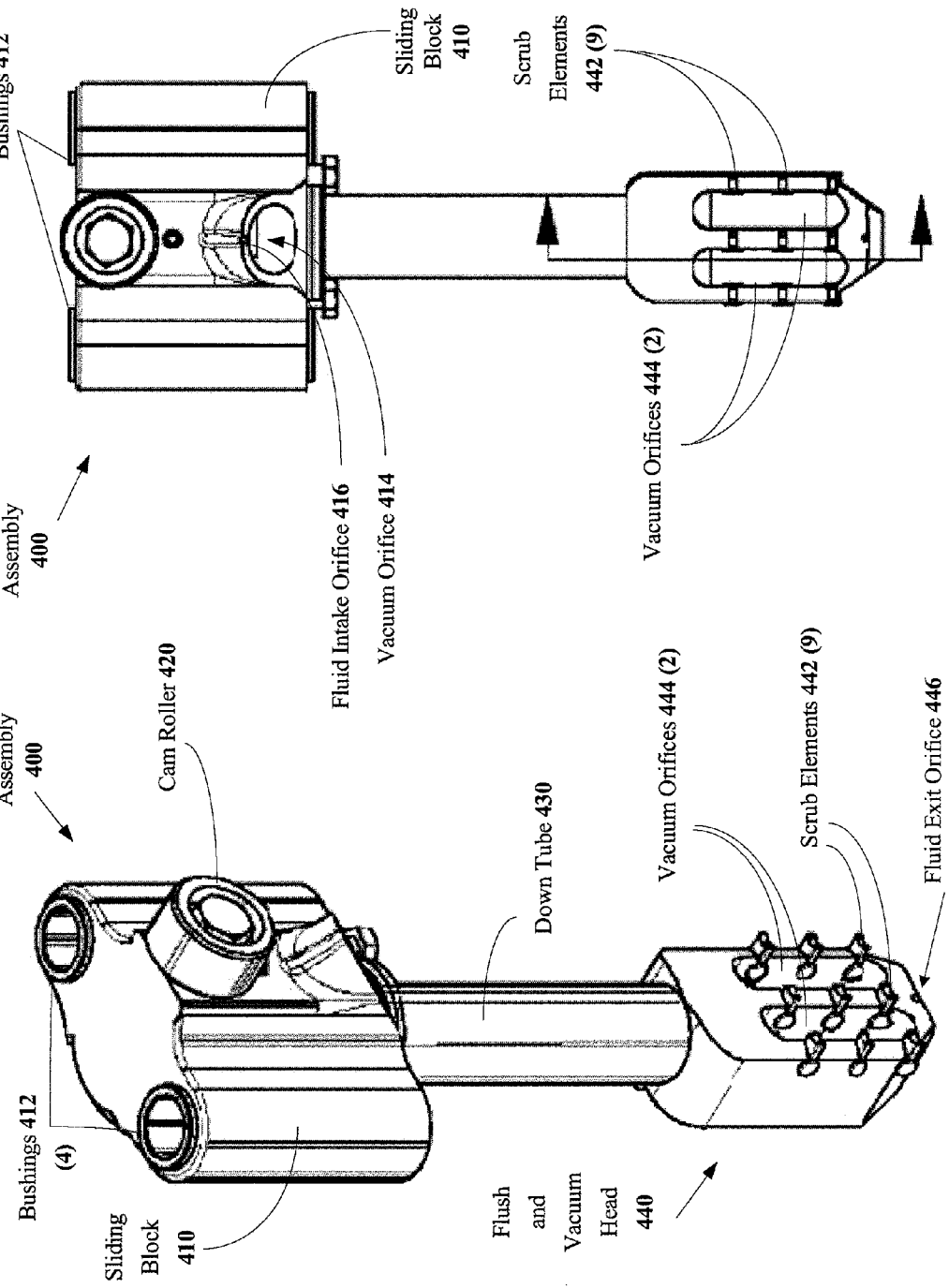

← Module Assembly 500

500

Module (aka wand) 500

← Cleaning fluid exit location and axis

Swivel Seal Retainer 532 (with hole for upper end of conduit 535)

MACHINE FOR LUNG REMOVAL IN POULTRY AND METHOD AND USE THEREOF

CROSS-REFERENCE TO RELATED APPLICATIONS

This application is a nonprovisional patent application, which claims priority from Provisional Application No. 61/022,923, filed Jan. 23, 2008, and is incorporated herein by reference in its entirety.

BACKGROUND OF THE INVENTION

1. Field of the Invention

The present invention relate generally to poultry processing equipment and more particularly, to an improved evisceration device for removing organs from a membrane-covered socket in the body cavity of a poultry carcass, such as the lungs 2. Prior Art During the slaughtering of poultry for processing into food, the internal organs, such as the kidneys and lungs, and in particular lungs, are required to be removed from the carcass as well as kidneys in some jurisdictions. Accordingly the lungs and or kidneys must be removed completely, otherwise there is product rejection and/or a need for reprocessing of that carcass.

Typically there is one mode of removing the lungs and or kidneys of poultry that have been utilized by the poultry processing industry. This mode is that the carcass is moved through a machine conveyed by means of a shackle suspended from an overhead track, the poultry is suspended neck down by means of the tarsal joints of the legs through two loops formed in the shackle. The carcass is conveyed through a machine consisting of plurality of suction modules, the modules are typically moved in and out of the poultry cavities by means of a cam follower which rides on as the carcass is conveyed through the machine a suction module lowers into the carcass. As the carcass travels around the machine, suction is turned on for a period of time and turned off at a determined point. The module exits the carcass at approximately 180 degrees from where it enters the carcass.

BRIEF SUMMARY OF THE INVENTION

The long-standing but heretofore unfulfilled need for an innovation that overcomes the limitations of the prior art is now met by a new, useful, and nonobvious invention.

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

In one embodiment of the present invention, the present invention provides a poultry processing method of withdrawing organs from the interior of the upwardly directed chest cavities of a plurality of birds being conveyed on hangars, the method comprising the steps of: A) conveying the birds along a path; B) for each one of the plurality of birds, inserting an elongate cleaning module portion downwardly into the chest cavity of the one bird, the cleaning module portion including a fluid supply port in communication with a pressurized liquid and a vacuum cavity in communication with a vacuum source; C) dispensing liquid from the fluid supply port into the chest cavity of the one bird; D) withdrawing an organ portion from the chest cavity of the one bird through the vacuum cavity along with the liquid with the assistance of the communicated vacuum; and E) withdrawing the elongate cleaning module portion.

Another embodiment of the present invention provides a poultry processing method of withdrawing organs from the interior of the upwardly directed chest cavities of a plurality of birds being conveyed on hangars, the method comprising the steps of: A) conveying the birds along a path; B) for each one of the plurality of birds, inserting the lower portion of an elongate cleaning module portion downwardly into the chest cavity of the one bird, the cleaning module portion including a vacuum cavity in communication with a vacuum source, the vacuum source being capable of being selectively activated and deactivated; C) withdrawing a first organ portion from the chest cavity of the one bird through the vacuum cavity with the assistance of the communicated vacuum while the vacuum is activated; D) at least partially deactivating and reactivating the vacuum while the elongate cleaning module portion is still in the chest cavity of the one bird; E) subsequent to Step "D", withdrawing a second organ portion from the chest cavity of the one bird through the vacuum cavity with the assistance of the communicated vacuum; and D) withdrawing the elongate cleaning module portion from the chest cavity of the one bird.

Another embodiment of the present invention provides a poultry processing apparatus for withdrawing organs from the interior of the chest cavities of birds being sequentially conveyed along a processing path on hangars attached to a hangar chain driving a hangar chain sprocket rotating about an axis, the apparatus including: a base frame; a valve camming module above and attached relative to frame; an inner manifold above and attached relative to valve camming module; an elongate shaft extending generally vertically above and having its lower end attached relative to the inner manifold, the shaft having a central shaft axis substantially parallel to the chain sprocket axis; a cleaning module camming drum fixed relative to the elongate shaft and including a nonlinear cam channel; a valve manifold rotatably mounted relative to the inner manifold generally about the central shaft axis, the valve manifold including a plurality of fluid ports; a slide bar cage assembly including a plurality of substantially parallel slide bars, the slide bar cage assembly above and attached relative to the valve manifold such that the slide bar cage assembly and the valve manifold can rotate together about the central shaft axis; a drive connection between the slide bar cage assembly and the hangar chain sprocket such that the hangar chain sprocket, the slide bar cage assembly, and the valve manifold rotate at the same rotational speed; a plurality of cleaning modules configured to index up and down on corresponding ones of the slide bars in response to engagement with the cam channel such that a lower portion of each of the cleaning modules can be partially placed within the chest cavity of a corresponding bird; and fluid connection lines intermediate the fluid ports of the valve manifold and the cleaning modules such that fluid communication is possible between the lower portion of each of the cleaning modules and the chest cavity of a corresponding bird during rotation of the hangar chain sprocket.

Another embodiment of the present invention provides a poultry processing method of withdrawing organs from the interior of the upwardly directed chest cavities of a plurality of birds being conveyed on hangars, the method comprising the steps of: A) providing a cleaning module assembly itself including 1) a sliding block configured to index up and down such that the module goes partially in and out of a bird cavity; 2) an elongate down tube rigidly extending downwardly from the sliding block but being selectively rotatable relative to the sliding block about its longitudinal central axis; and 3) a fluid transfer head for being placed in one of the chest cavities, the head attached to the down tube; B) processing a first plurality of birds with the elongate down tube in a first position; C) rotating the elongate down tube to a second rotated position being substantially 180 degrees rotated about the longitudinal axis relative to the first position; and D) processing a second plurality of birds with the elongate down tube to a second rotated position, such that the orientation of the fluid transfer head is reversed 180 relative to its position during step "B".

Another embodiment of the present invention provides a poultry processing cleaning module assembly itself including 1) a sliding block configured to index up and down such that the module goes partially in and out of a bird cavity; 2) an elongate down tube rigidly extending downwardly from the sliding block; and 3) a fluid transfer head for being placed in one of the chest cavities, the head attached to the down tube and including at least vacuum orifices, each orifice having a plurality of replaceable scrub elements mounted about its periphery.

Another embodiment of the present invention provides a poultry processing cleaning module assembly for use with a bird having a cavity, the module itself including: 1) a sliding block configured to index up and down such that the module goes partially in and out of a bird cavity; 2) an elongate down tube rigidly extending downwardly from the sliding block; and 3) a fluid transfer head including two separate segments movable relative to each other and the down tube.

BRIEF DESCRIPTION OF THE SEVERAL VIEWS OF THE DRAWING(S)

Figure 7:
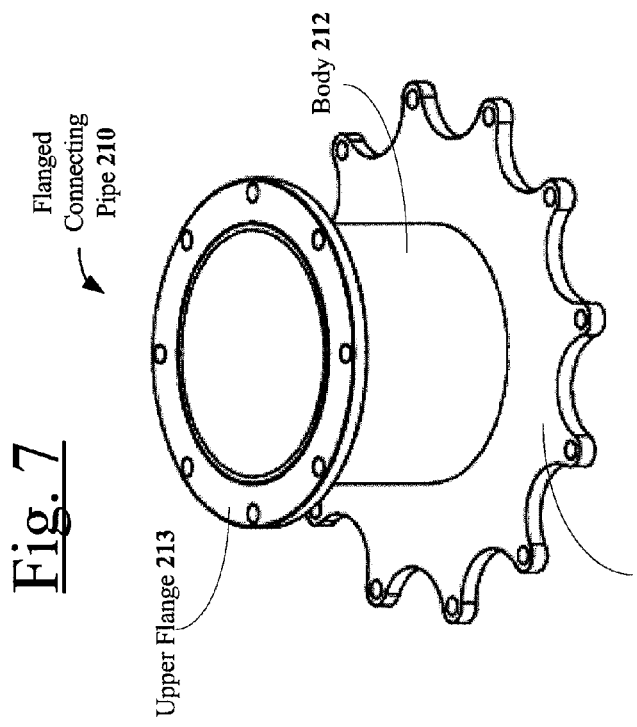

FIG. 7 is an isolated perspective view of the riding flange connecting pipe 210. The flanged connecting Pipe 210 includes a tubular body 212, an upper flange 213, and a lower flange 214.

Figure 8:
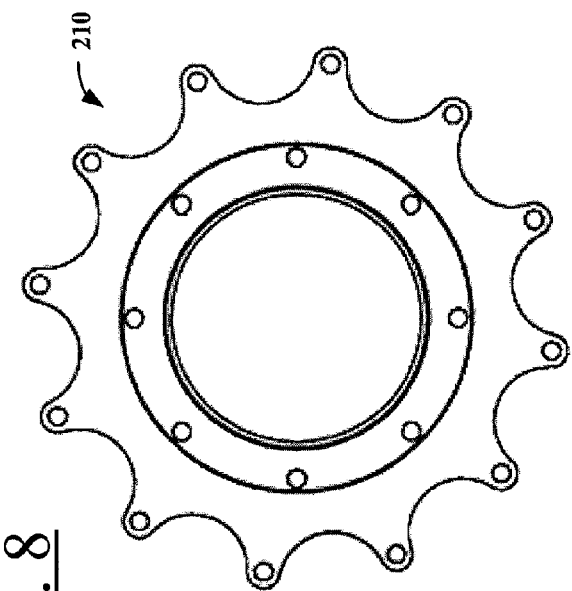

FIG. 8 is a top elevational view of the flanged connecting pipe 210 of Figure F.

Figure 9:
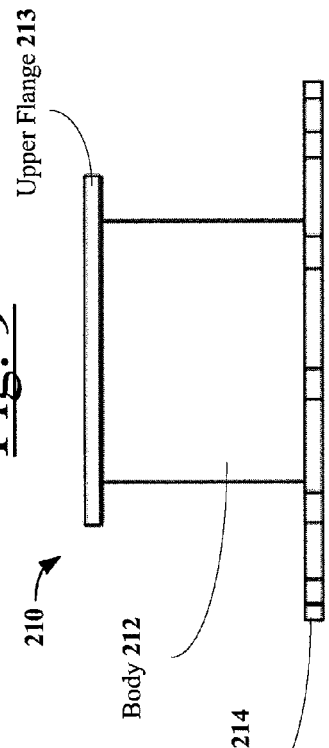

FIG. 9 is a side elevational view of the flange connecting pipe 210.

Figure 10:
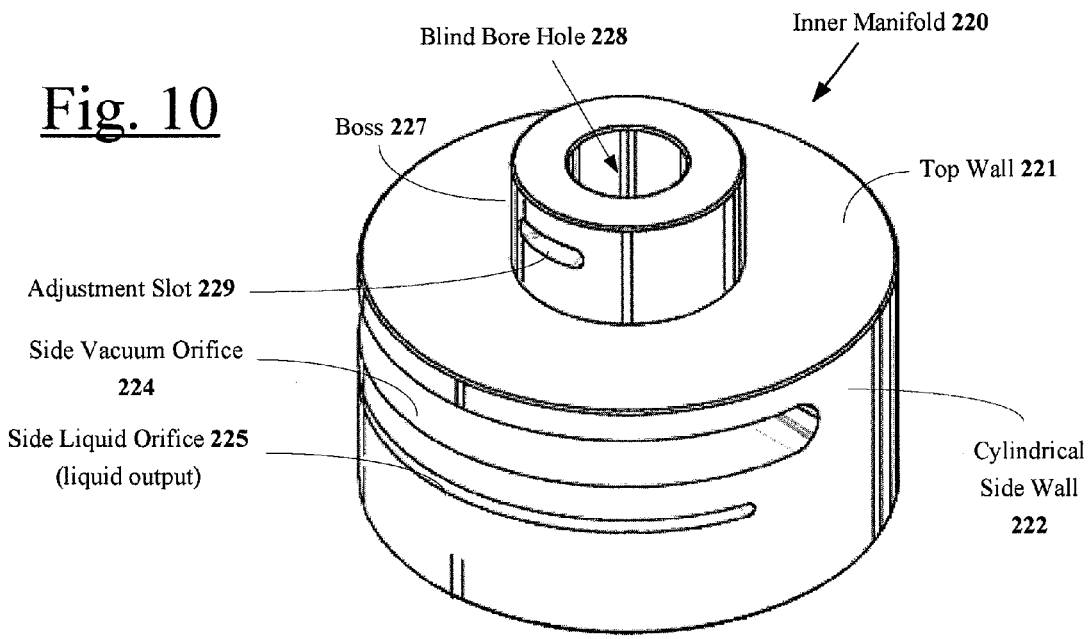

FIG. 10 is an isolated perspective view of the inner manifold 220 according to one of the present inventions. This view is generally of the top of the device.

Figure 11:
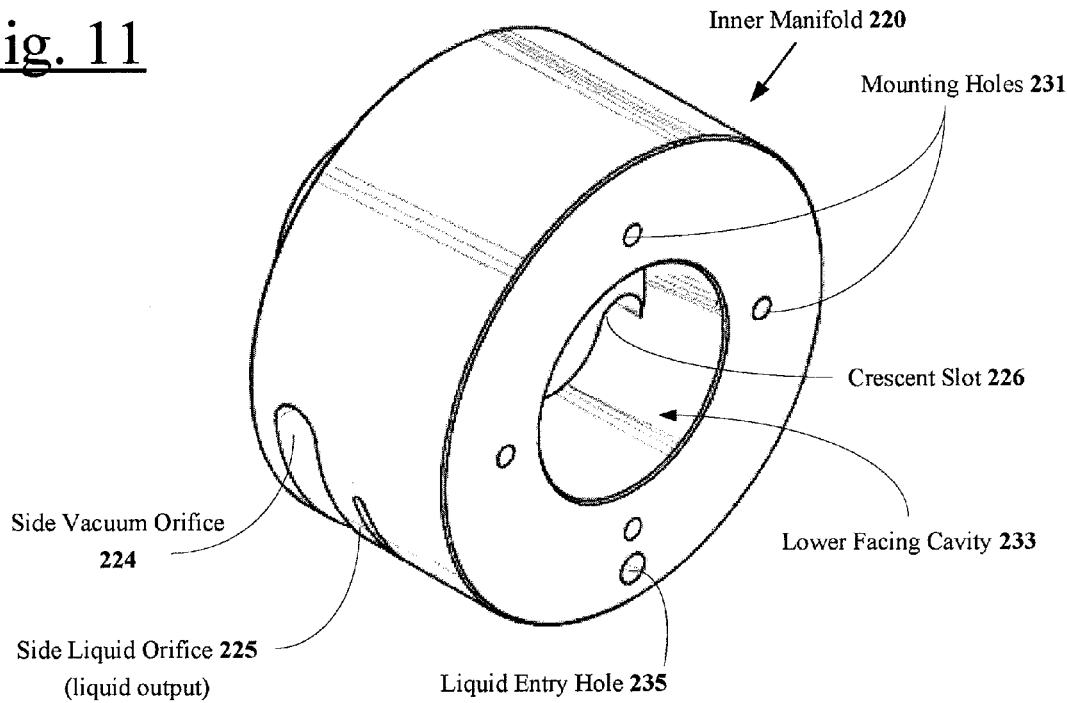

FIG. 11 is another perspective view of the inner manifold 220, viewing the underside of the inner manifold 220.

FIG. 12 is an isolated perspective view of the valve manifold 240 according to the present invention.

FIG. 13 is an partial perspective view of the valve manifold 240 according to the present invention shown in FIG. 12.

FIG. 14 is a top plan view of the valve manifold 240.

FIG. 15 is a bottom plan elevational view of the valve manifold 240.

Figure 16:
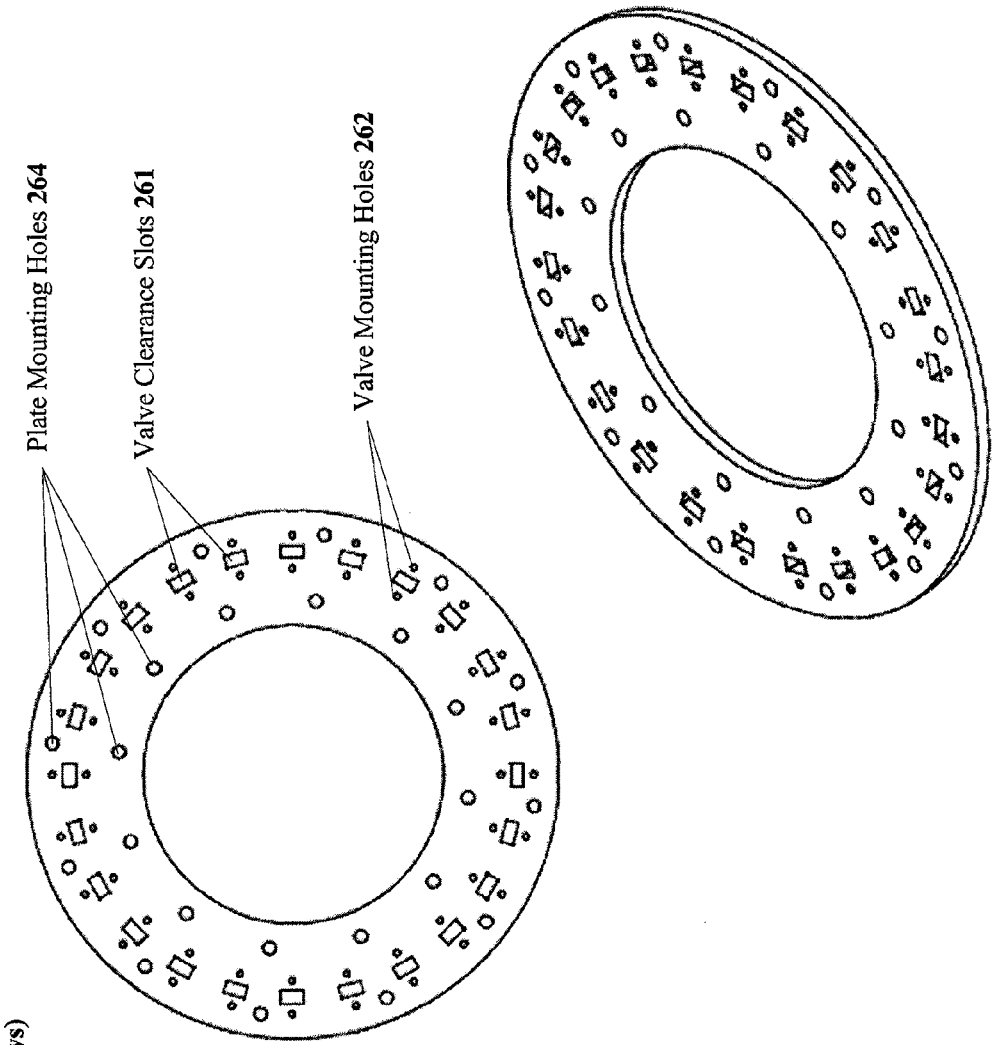

FIG. 16 shows two views of a valve manifold connector plate 260 according to one embodiment of the present invention. The top left view is a top elevational view, where as the view further to the bottom and right is a perspective view. This may be seen, this valve manifold connector plate 260 is generally plate-like in its configuration.

Figure 17:
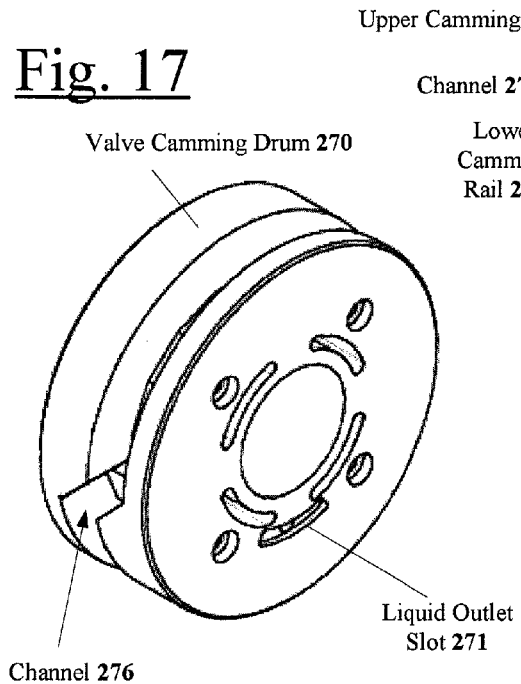

FIG. 17 is an isolated perspective view of the module camming drum 166, showing the underside of the drum, namely the side that would face the floor.

Figure 18:
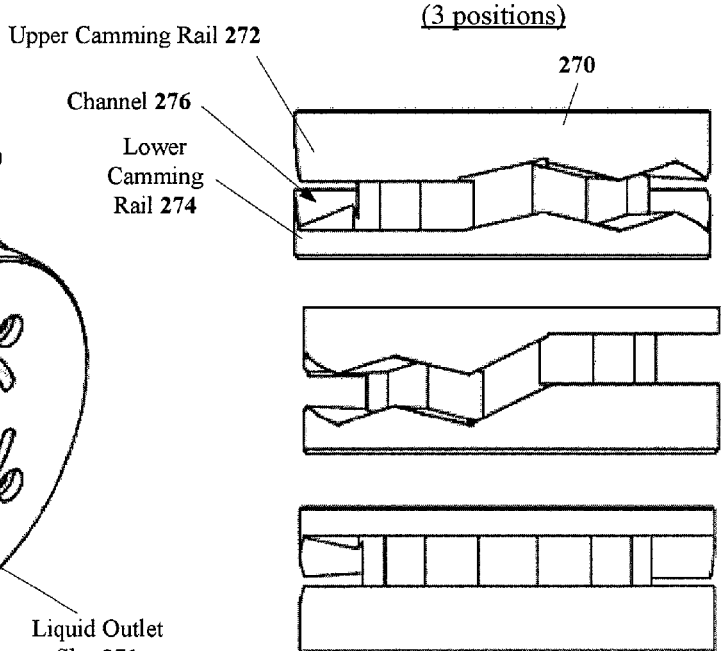

FIG. 18 shows three different side elevational views of the module camming drum 166, the differences due to different rotational positions about the central shaft axis.

Figure 19:
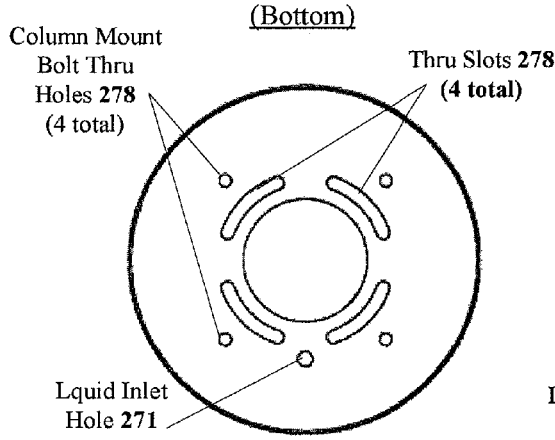

FIG. 19 is a bottom plan view of the module camming drum 160.

Figure 20:
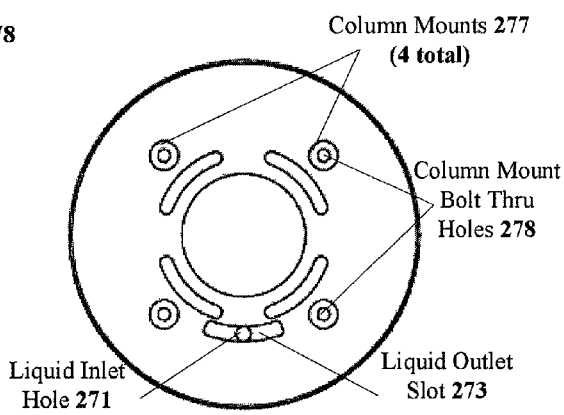

FIG. 20 is a top plan view of the module camming drum 160.

Figure 21:
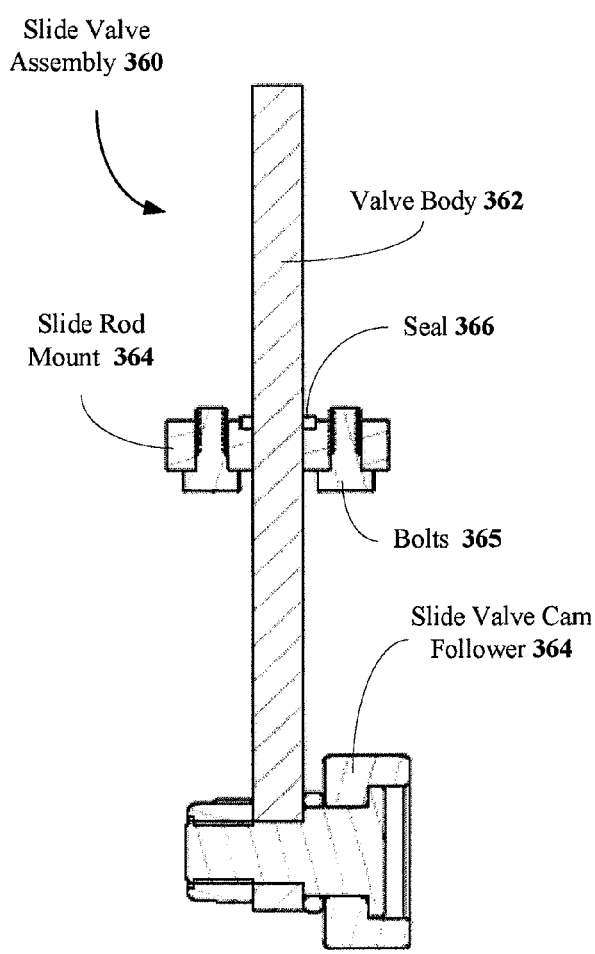
Figure 22:
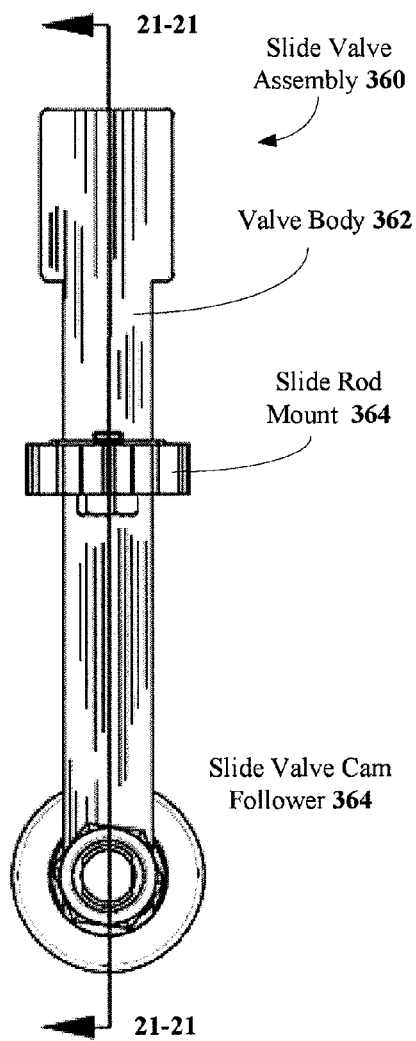

FIG. 21 is a side elevational cross-sectional view of a slide valve assembly 360 according to one of the present inventions, with the cross section being taken along line 21-21 of FIG. 22.

FIG. 22 L is an "outside" (looking towards the shaft) elevational view of a slide valve assembly 360 according to the present invention.

FIG. 23 is an exploded view of the slide valve assembly 360.

FIG. 24 is a perspective view of a module assembly 400.

FIG. 25 is an "inside" (as viewed from the central shaft) elevational view of a slide valve assembly 360 according to the present invention.

Figure 26:
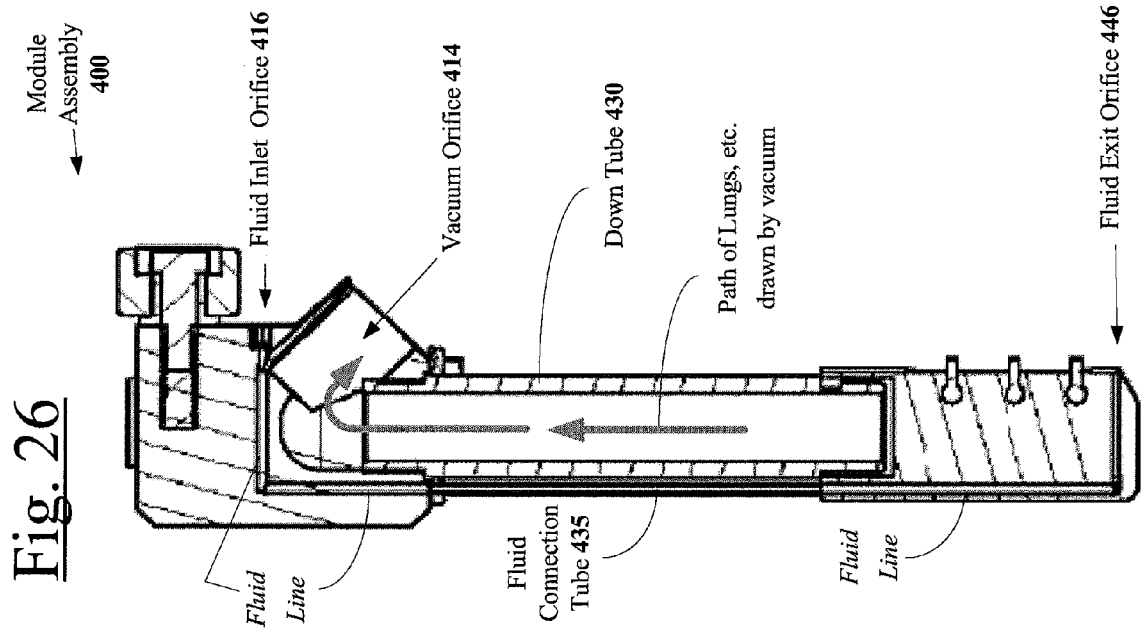

FIG. 26 is a side elevational cross-sectional view of the module 400 shown in FIGS. 24 and 25.

Figure 27:
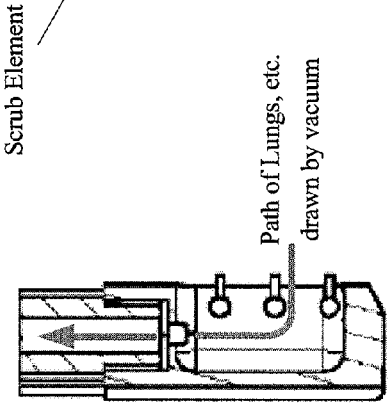

FIG. 27 is a side cross-sectional view similar to FIG. 26 but taken along a different cross section.

Figure 28:
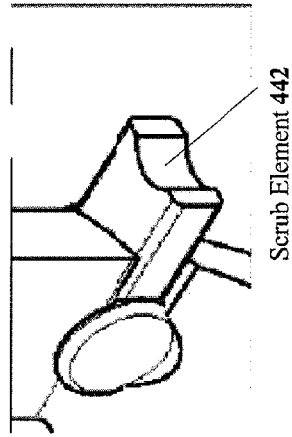

FIG. 28 is a partial view showing an exemplary scrub element 442, put in place in the module assembly 400.

Figure 29:
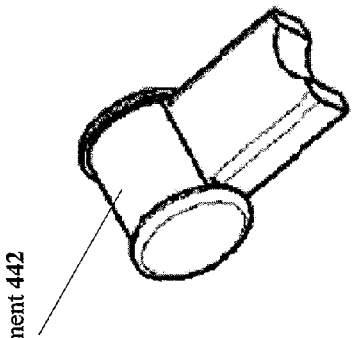

FIG. 29 is an isolated view of an exemplary scrub element 442.

Figure 30:
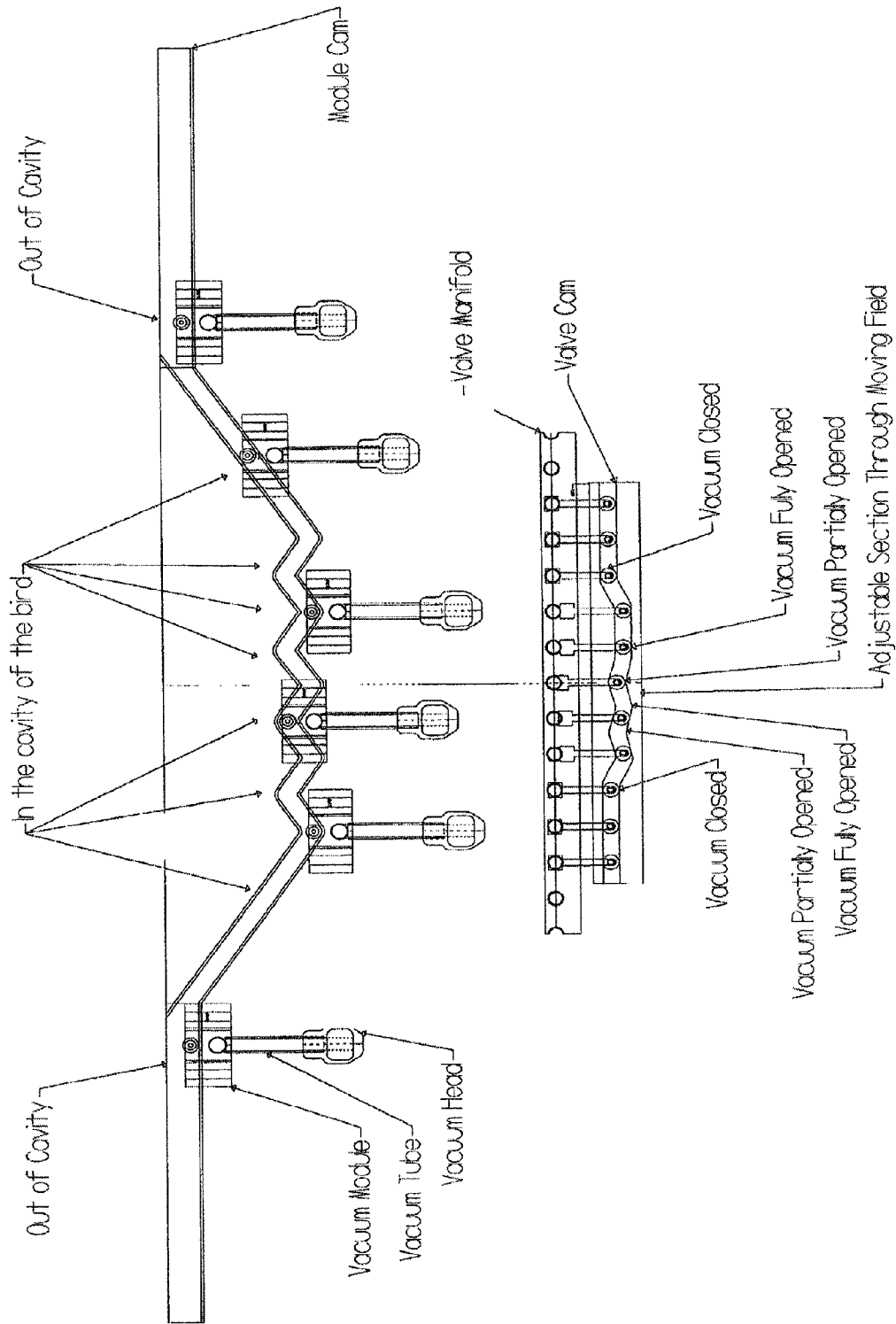

FIG. 30 is an illustrative view showing the relative movements of the vacuum head as they go through the cam channel 166 of the module camming drum 160 as well as the relative movements at the valves as they are actuated by the valve manifold. As may be seen, there are several "jogs" of the modules 400 (or 500) while in the bird. These "jogs" are not shown in FIGS. 1-2, and should be considered an alternate module "jog" embodiment. Also shown are upper camming rails 161, lower camming rails 164, and cam channel 166.

Figure 31:
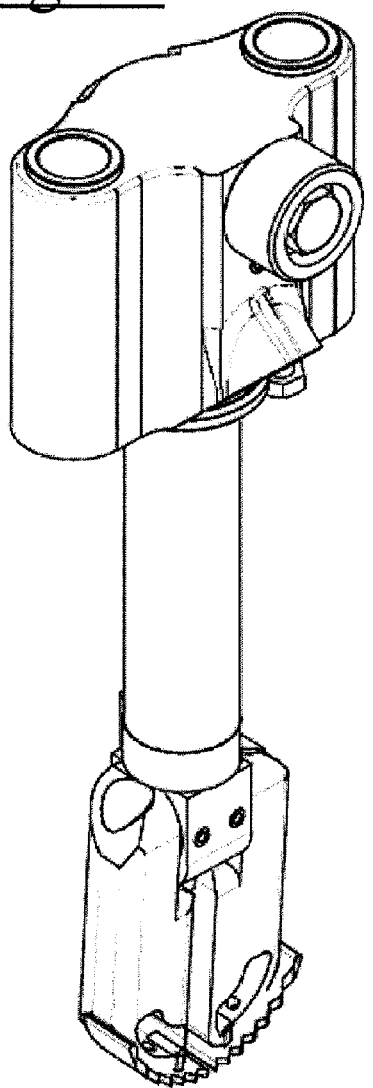

FIG. 31 is a perspective view of a module assembly 500, which is different from the module assembly 400 but interchangeable.

Figure 32:
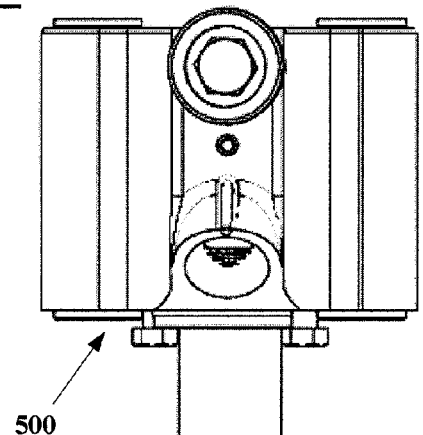

FIG. 32 is an inside elevational view of the module assembly 500.

Figure 33:
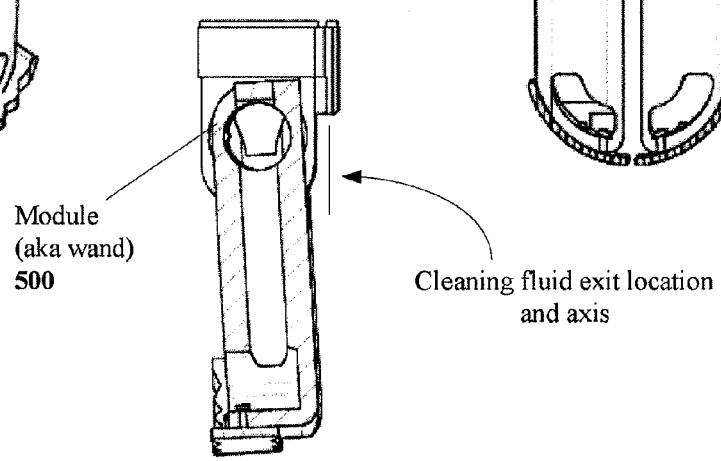

FIG. 33 is an isolated view of the lower portion of 500.

Figure 34:
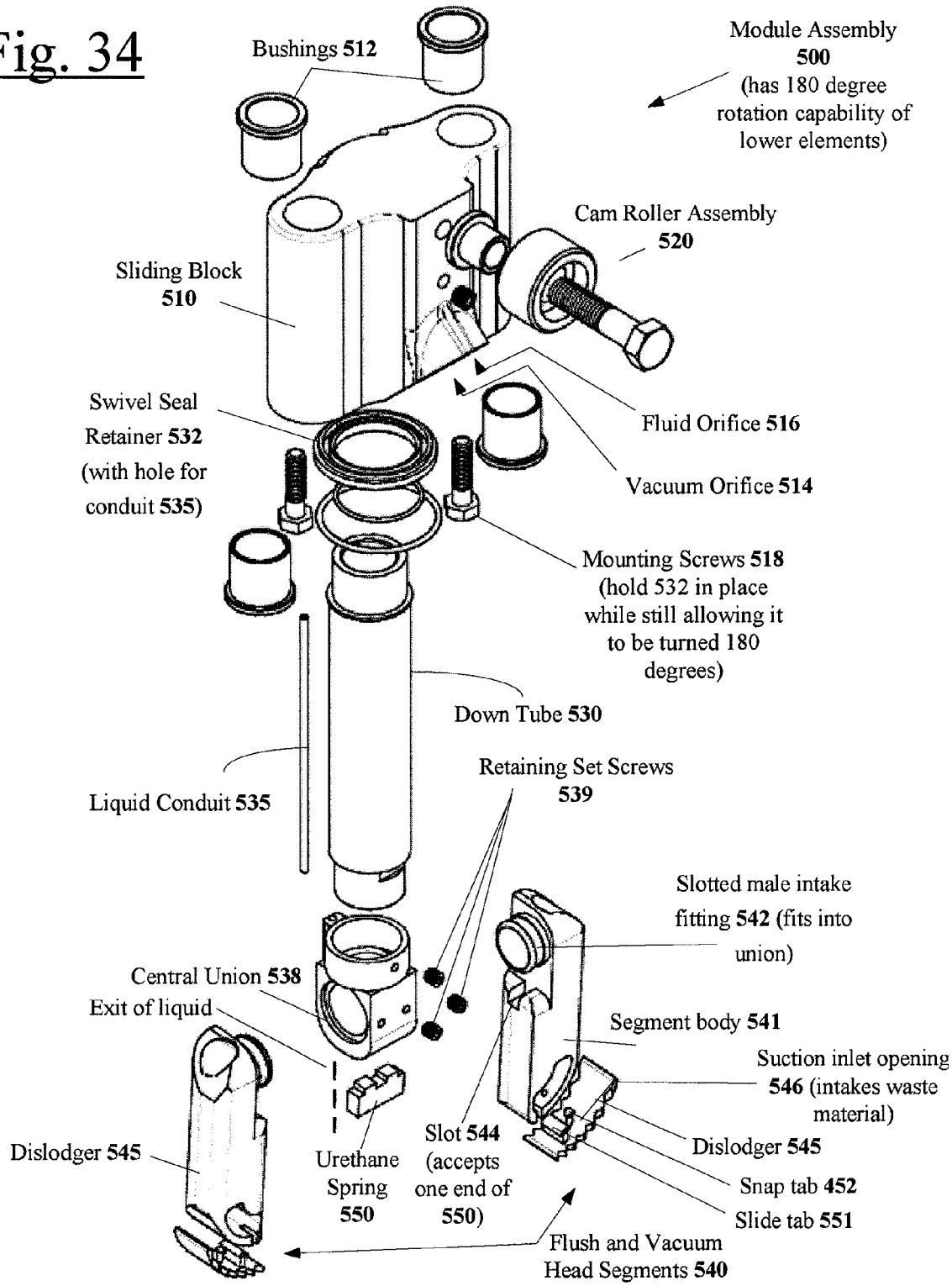

FIG. 34 is an exploded view of the module 500.

Figure 35:
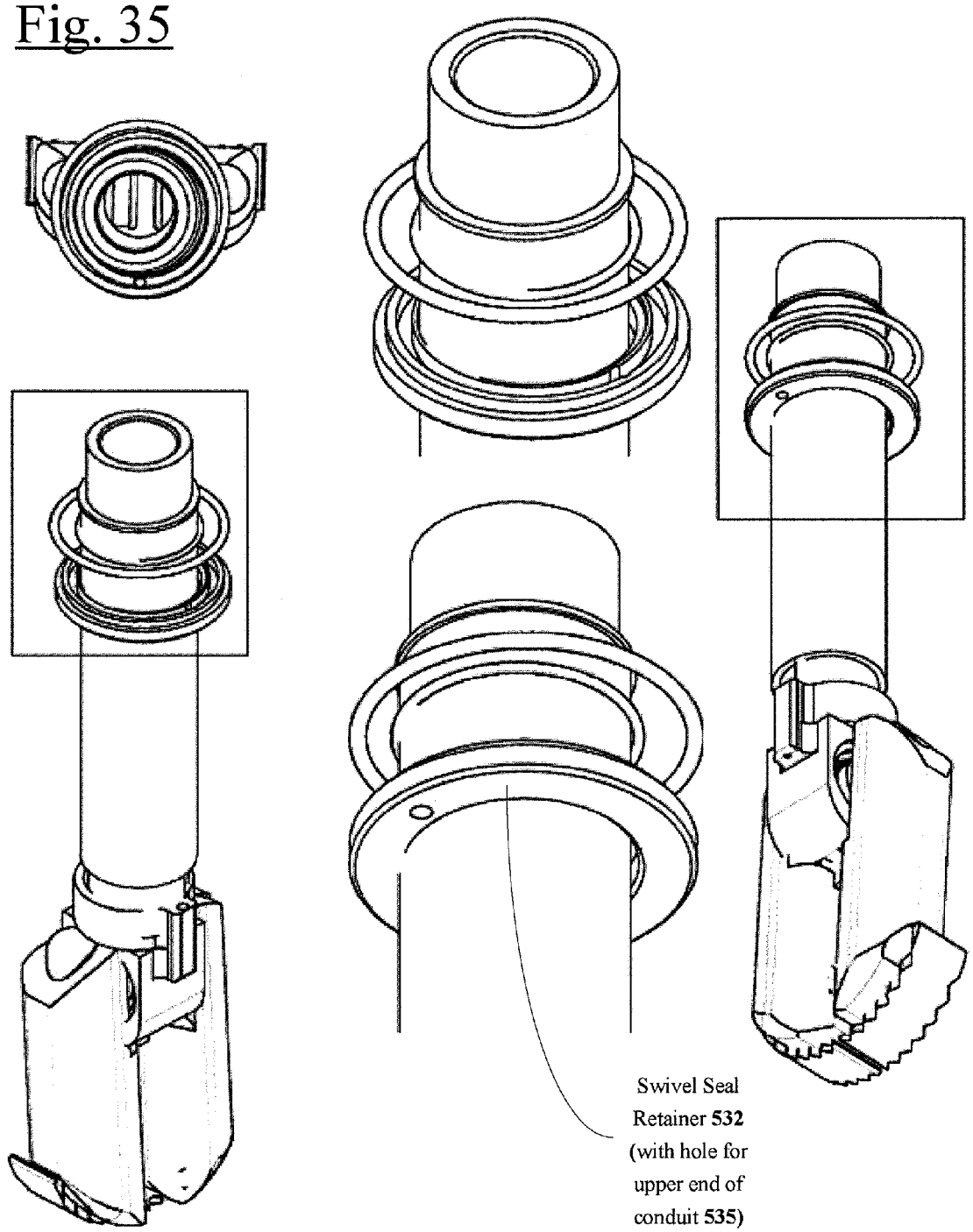

FIG. 35 is a collection of views of part of the module 500.

Figure 36:
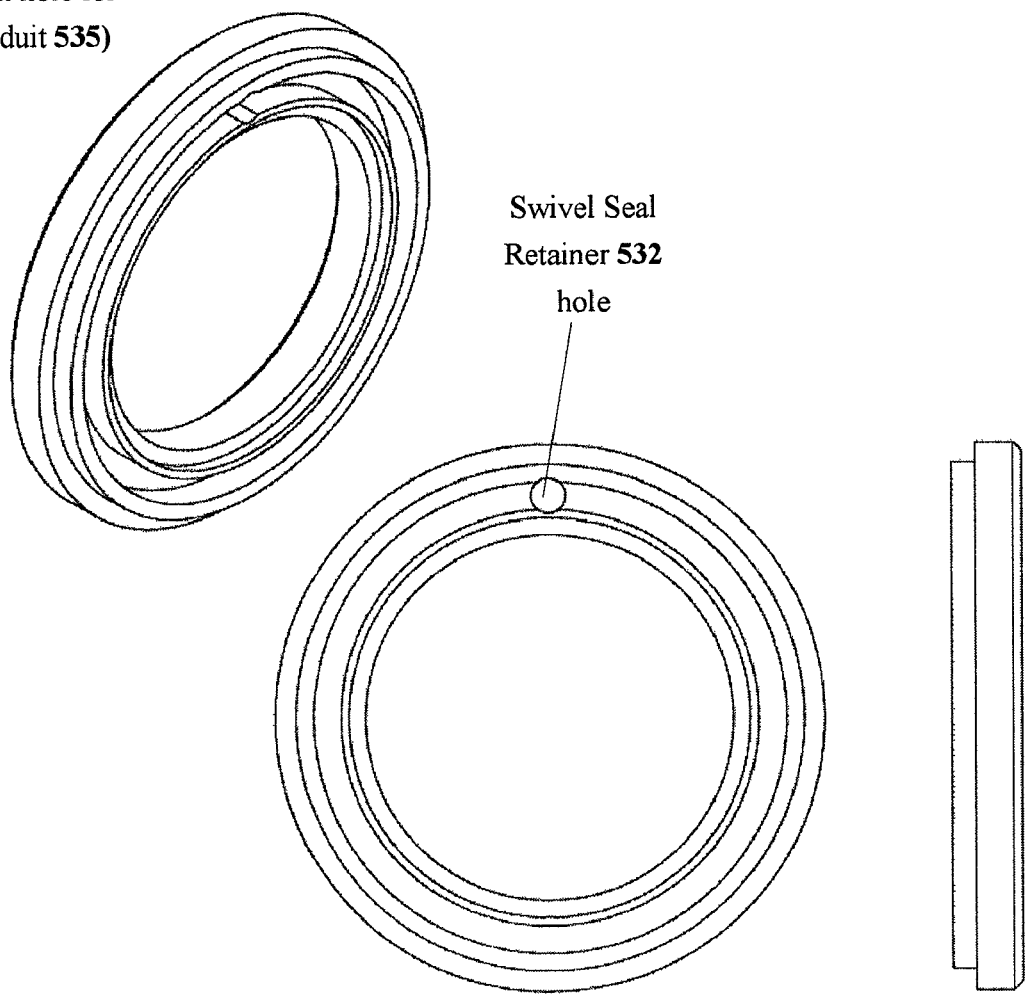

FIG. 36 is an isolated view of the swivel seal retainer 532.

DETAILED DESCRIPTION OF THE INVENTION

In describing the preferred and selected alternate embodiments of the present invention, as illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. If an item is noted as being referenced in a drawing, this does not mean the item is not shown in another drawing.

Bird Cleaning Apparatus 10 Generally

Figure 1:
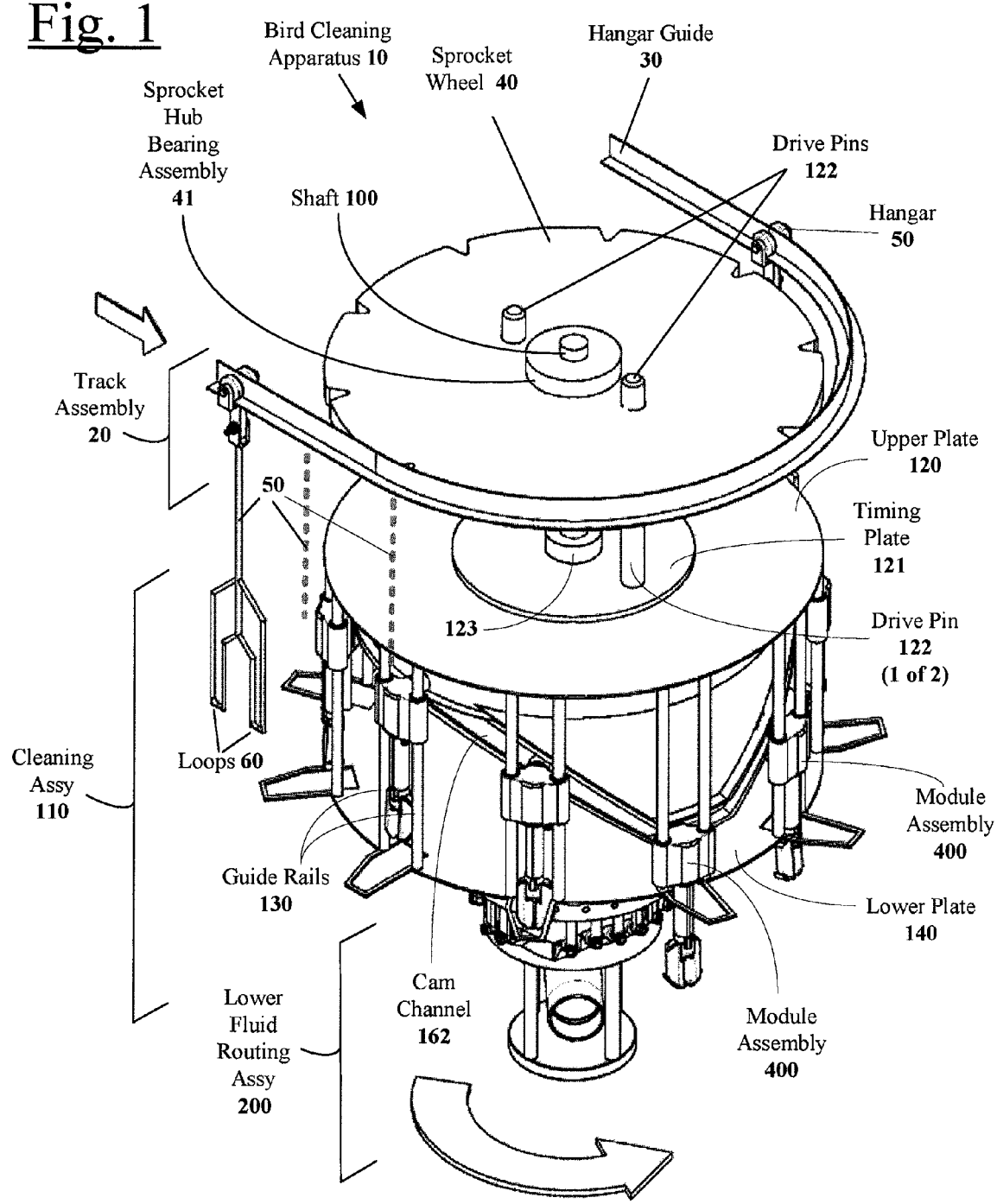
FIG. 1 is a perspective view of a bird cleaning apparatus 10. It should be understood that this view does not show various connecting hoses which supply cleaning liquid and vacuum to the module assemblies 400.

Reference is first made to FIG. 1, which shows a bird cleaning apparatus 10 for removing interior components such as the lungs and/or kidneys of poultry or other animals 5. This apparatus 10 includes the following general elements:

track assembly 20
shaft 100
cleaning assembly 110
lower fluid routing assembly 200
module assemblies 400

Generally described, the bird cleaning apparatus 10 accepts poultry (a.k.a. "bird" elements 5 being conveyed along the track assembly 20, inserts and removes the lower ends of module assemblies 400 (which could also be embodiment 500) into and from the chest cavities of the poultry elements 5 (hereinafter "birds" 5) to facilitate the removal of lungs and other internal organs therefrom by suction provided by vacuum. The coordination of the placement of the module assemblies 400 into and out of the poultry elements 5 as they are conveyed along the track assembly 20 is assisted with the use of cleaning assembly 110. The module assemblies 400 are supplied with vacuum and cleaning water by the lower fluid routing assembly 200. The module assemblies 400 are supplied with vacuum at prescribed periods in order to both conserve vacuum as well as to provide an advantageous periodic vacuum "surge", discussed later.

For purposes of this description, the rotational axis of the various components around the central shaft of the device will be assumed to be substantially vertical, although this is only a relative term for purposes of discussion.

Track Assembly 20

Reference is made for example to FIG. 1. Track assembly 20 preferably comprises hangar guide 30, sprocket wheel 40 and conventional hangers 50, wherein hangers 50 comprise loops 60 preferably disposed at the bottom thereof. Hangar guide 60 is shown which provide guidance for the hangars as they go along their path around the device 10. Chain connecting the hangars 50 is not shown, but is such as that well known in the art. This is the chain that drives the sprocket wheel 40.

Figure 6:
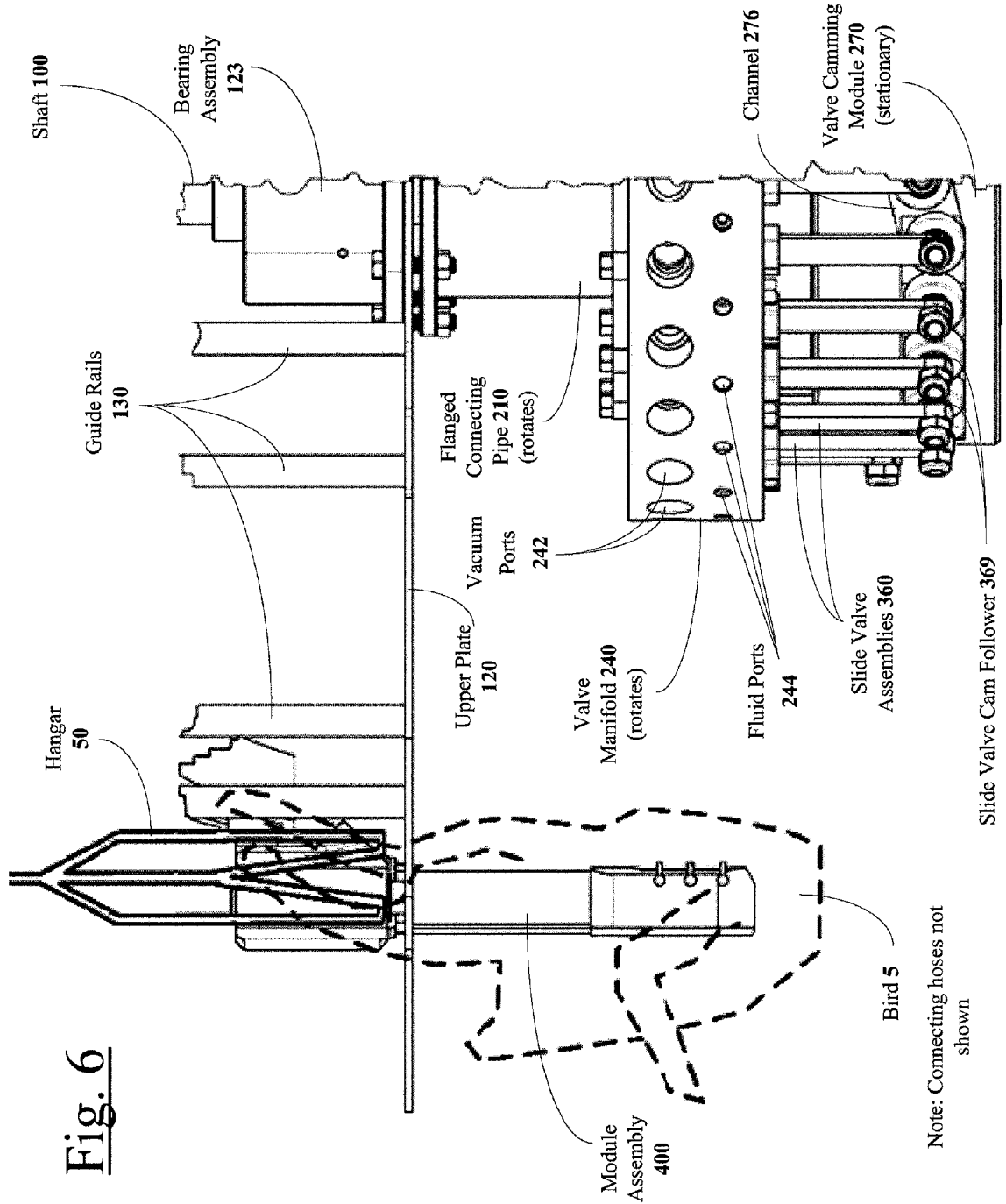
FIG. 6 is a partial side elevational view showing a bird 5 in a dotted line.

The track 30 is substantially continuous and is such as known in the art. The hangar 50 (a.k.a., shackles) are likewise well known in the art as devices which transport chicken or other poultry via a processing plant under its own motive force. Reference is made to FIG. 6 which shows an exemplary bird 5 placed within a hangar, with its tarsal joints captured in the loops as known in the art.

It should be understood that the track 30 likewise provides the motive force to provide the various rotational and linear operations of the apparatus 10, except for any movements which might be specifically noted to be provided by the vacuum or cleaning liquids described later.

The sprocket wheel 40 is such as that known in the art, to the extent it is rotatably mounted about a substantially vertical axis by external means (not shown), such that the sprocket wheel 40 can continue to rotated even if the apparatus 10 is withdrawn downwardly and away from the sprocket wheel for cleaning and/or maintenance as discussed later in this application. This substantially vertical axis is preferably aligned with the central shaft axis of the apparatus 10 as described further below.

The sprocket wheel may rotate at various speeds as needed, but a "sprocket speed" will be referenced in this discussion as the speed at which the sprocket is rotating. As various elements rotate or move in sync with the sprocket, they may be referenced as moving at "sprocket speed".

A bearing assembly 41 (see FIGS. 1 and 3) provides lateral support to the upper end of the shaft 100 described below, while still allowing the upper end of the shaft 100 to be moved downwardly relative to the bearing assembly 41.

Shaft 100

The shaft 100 includes an upper tip portion which may be viewed in FIG. 1, and is configured to be slid in and out of the bearing assembly 41 which is attached relative to the sprocket wheel 40 as shown in FIG. 1. This allows the upper end of the shaft 100 to be withdrawn downwardly relative to the bearing assembly 41 for cleaning and/or service of the apparatus 10.

The shaft 100 does not rotate. As discussed in detail below it provides rotational support for various elements later discussed. It is bolted at its bottom by bolt 101 (see FIG. 4) to the inner manifold 220 discussed below.

For purposes of later discussion, a "central shaft axis" is herein defined as the central longitudinal axis of the shaft, which in one preferred embodiment is substantially vertical. It will be seen that various components of this device rotate about this axis.

Cleaning Assembly 110

The cleaning assembly 110 includes the following general elements:

| | |
|---|---|
| upper plate 120 | (rotates with sprocket about central shaft axis) |
| Timing plate 121 | (rotates with sprocket about central shaft axis) |
| Drive pins 122 | (rotate with sprocket about central shaft axis) |
| guide rails 130 | (rotate with sprocket about central shaft axis) |
| lower plate 140 | (rotates with sprocket about central shaft axis) |
| module camming drum 160 | (stationary) |

The general function of the cleaning assembly is to support and coordinate placement of the wand assemblies 300 into and out of the poultry elements 5 as they are conveyed along the track assembly 20. Generally described, the cleaning assembly provides guidance for the wand assemblies 300 described later in this application such that a desired portion of each of the wand assemblies 300 can be inserted into the chest cavity of a bird 5 according to a predetermined timing and placement protocol.

The upper plate 120, guide rails 130, and lower plate 140 are mounted together as a substantially rigid "cagelike" subassembly (which may be referenced as a "slide bar cage assembly" which rotates with the sprocket about the central shaft axis. The upper and lower plates 120, 140, are substantially platelike and have their major planar surfaces substantially horizontal when installed.

The guide rails 130 are elongate and cylindrical, and in the preferred embodiment are mounted in set of parallel pairs, with each pair associated with a corresponding one module assembly 400. As may be understood, these pairs of guide rails 130 provide vertical paths for the module assemblies 400 to move relative thereto, while at the same time the guide rails 130 themselves are rotating about the central shaft axis of the device 10, thus moving the module assemblies 400 along a path which both goes up and down while in coordination with the birds 5 as they pass along a portion of their path.

The upper plate 120 is rotatably supported relative to the shaft by an upper plate bearing assembly 123. The upper plate bearing assembly 123 provides vertical positioning of the upper plate on the central shaft 100, and also provides a rotational bearing about the central shaft axis.

The lower plate 140 includes a plurality of loop openings 142, and is rotatably supported relative to the shaft by a lower plate bearing assembly 143. These loop openings 142 provide location for conveyed birds as known in the art, and in the present invention the head and down pipe of the modules pass into and out of these loops as they index downwardly and upwardly. The lower plate bearing assembly 143 provides vertical positioning of the upper plate on the central shaft 100, and also provides a rotational bearing about the central shaft axis.

Lower plate 140 is disposed atop and is connected to connecting pipe 210, and causes connecting pipe 210 to rotate as described later.

A timing plate 121 is rigidly mounted atop the upper mounting plate 120 and rotates therewith. This timing plate 121 is configured to allow for the timing between the sprocket wheel 40 and the rotating upper plate 120, guide rails 130, lower plate 140, and most importantly the wand assemblies 300, such that the hangars remain disposed in adjacent position to module assemblies 400 as hangers 50 traverse around cleaning assembly 110. Although the adjustment feature could be provided in many ways, one preferred way is to provide headed fasteners having engaging ends passing through holes in the timing plate 140, through adjustment slots (not shown) in the upper plate 120, and which are engaged by captured nuts or the like underneath and against the upper plate. The goal is to allow for torque to be transferred from the upper plate 121 to the timing plate 121 while allowing occasional angular adjustment to address timing.

Rigidly attached atop the timing plate 121 are two drive pins 122 which allow the sprocket wheel to drive the timing plate, and this drive other elements such as 120, 130, 140 as well at the same rotational speed. The lower ends of each of the drive pins 122 are rigidly attached relate to the timing plate 121; the upper ends of each of the drive pins 122 slidably engage vertical holes spaced 180 degrees from each other. As may be understood, this allows the top ends of the drive pins 122 to become disengaged with the sprocket as the shaft 100 is withdrawn downwardly is lowered for maintenance or cleaning purposes of the device 10 as described elsewhere.

The stationary module camming drum 160 is stationary and includes upper camming rails 162 and lower camming rails 164, which combine with the side of the drum to define a cam channel 166. The stationary module camming drum 160 is mounted relative to the shaft by a centrally located hub 161 shown in FIG. 3, which is secured to the shaft by two bolts (not shown) 180 degrees apart. Thus any rotation (not during bird processing but during adjustment of the apparatus) of the shaft 100 causes rotation of the drum 160 and vice versa.

The function of the stationary module camming drum 160 is to define a path to accept and guide cam rollers 420 associated with the module assemblies 400 to cause the module assemblies 400 to move up and down on their respective guide rails 130, thus causing the vacuum/flush and vacuum heads 440 to go in and out of the bird cavities.

Lower Fluid Routing Assembly 200

The lower fluid routing assembly 200 includes the following major elements:
Flanged Connecting Pipe 210
Inner manifold 220 (×800)
Valve manifold 240 (×180)
Valve Manifold Connector Plate 260
Valve Camming Drum 270 (×135)
Support Columns 280
Exhaust Elbow 300
Foot Plate 310
Connecting Bolts 320
Indexing Shaft 330
Vacuum Hoses 340 (×190)
Cleaning liquid Hoses 350
Slide Valve Assemblies 360 (×185)
Flanged Connecting Pipe 210

The flanged connecting Pipe 210 includes a tubular body 212, an upper flange 213, and a lower flange 214.

The upper flange 213 attaches the underside of the lower plate 120.

The lower flange 214 attaches to the upper side of the valve manifold 240.

The flange connecting pipe 210 provides a rigid connection between the lower plate 120 and the valve manifold 240, and rotates along with them at product supply chain sprocket speed.

Inner Manifold 220

The inner manifold 220 is stationary during normal operation, fits partially within the valve manifold 240 (which rotates), and is supported by and bolted to the top of the valve camming drum 270. It is bolted by bolt 101 (see FIG. 4) to the lower end of shaft 100.

Figure 3:
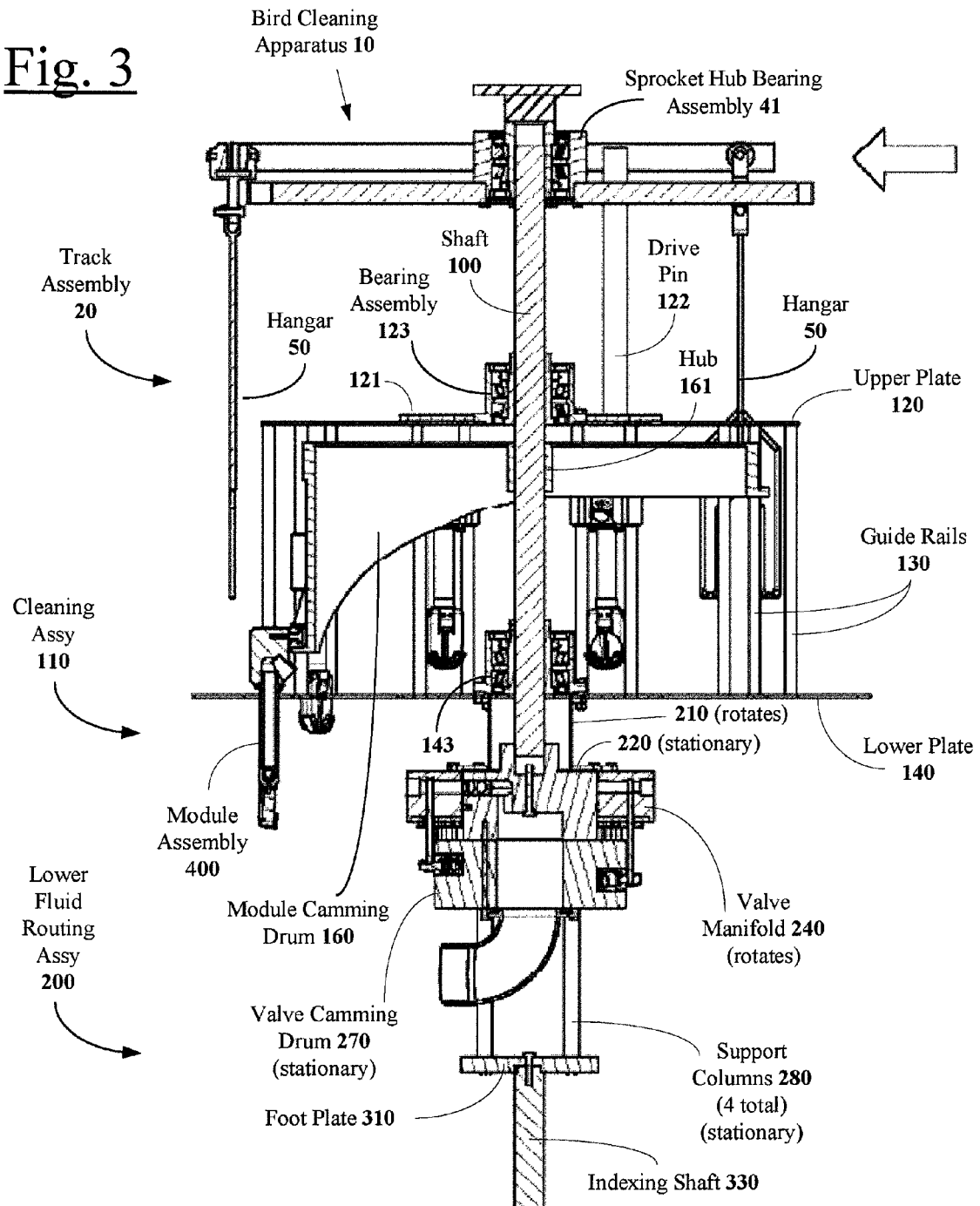
FIG. 3 is a view similar to that of FIG. 2, except that a cross-section has been taken along line 3-3 of FIG. 2. It should be understood that this view does not show various connecting hoses which supply cleaning liquid and vacuum to the module assemblies 400.
Figure 4:
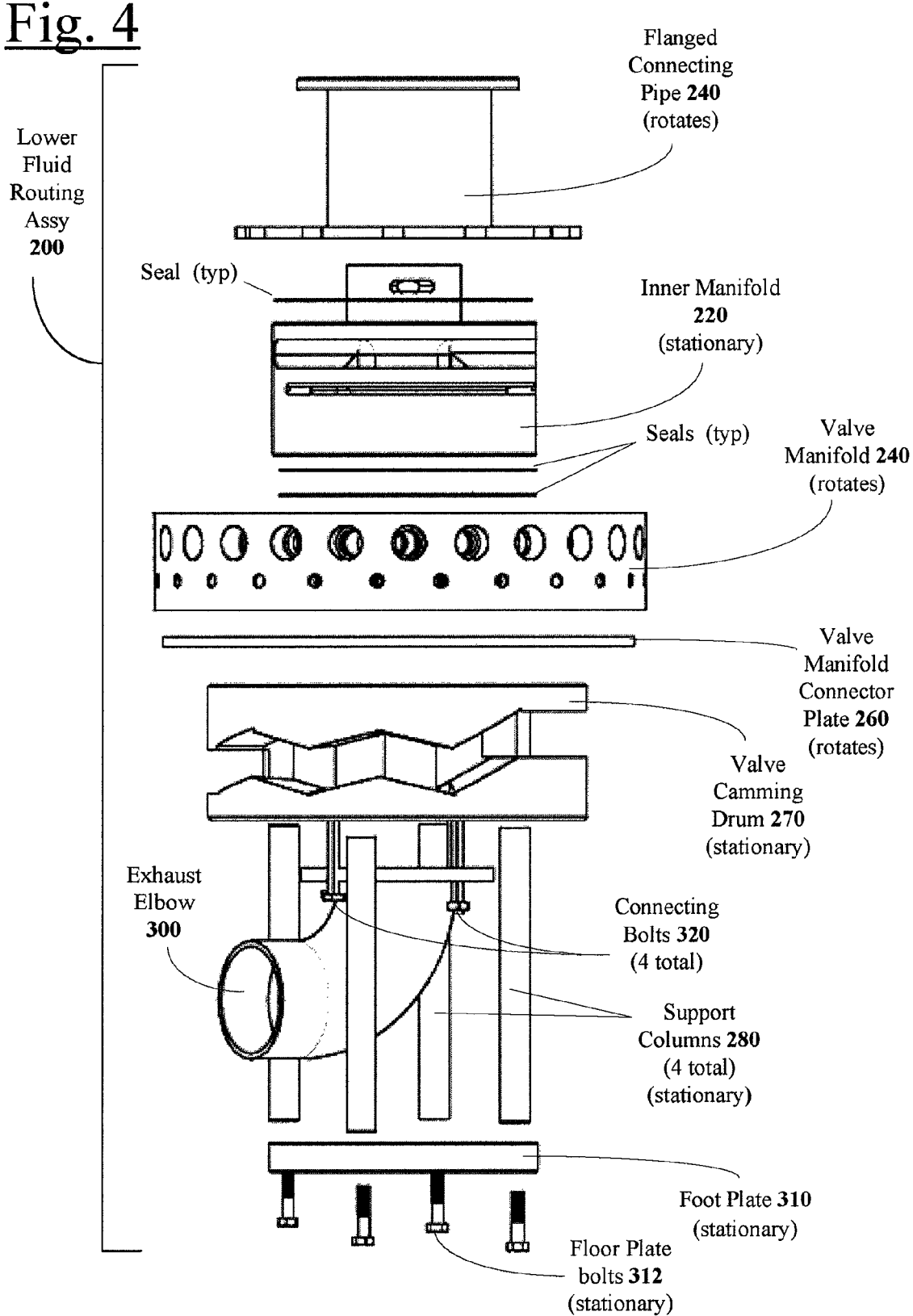
FIG. 4 is an exploded view of the lower fluid routing assembly 200 according to the present invention.
Figure 5:
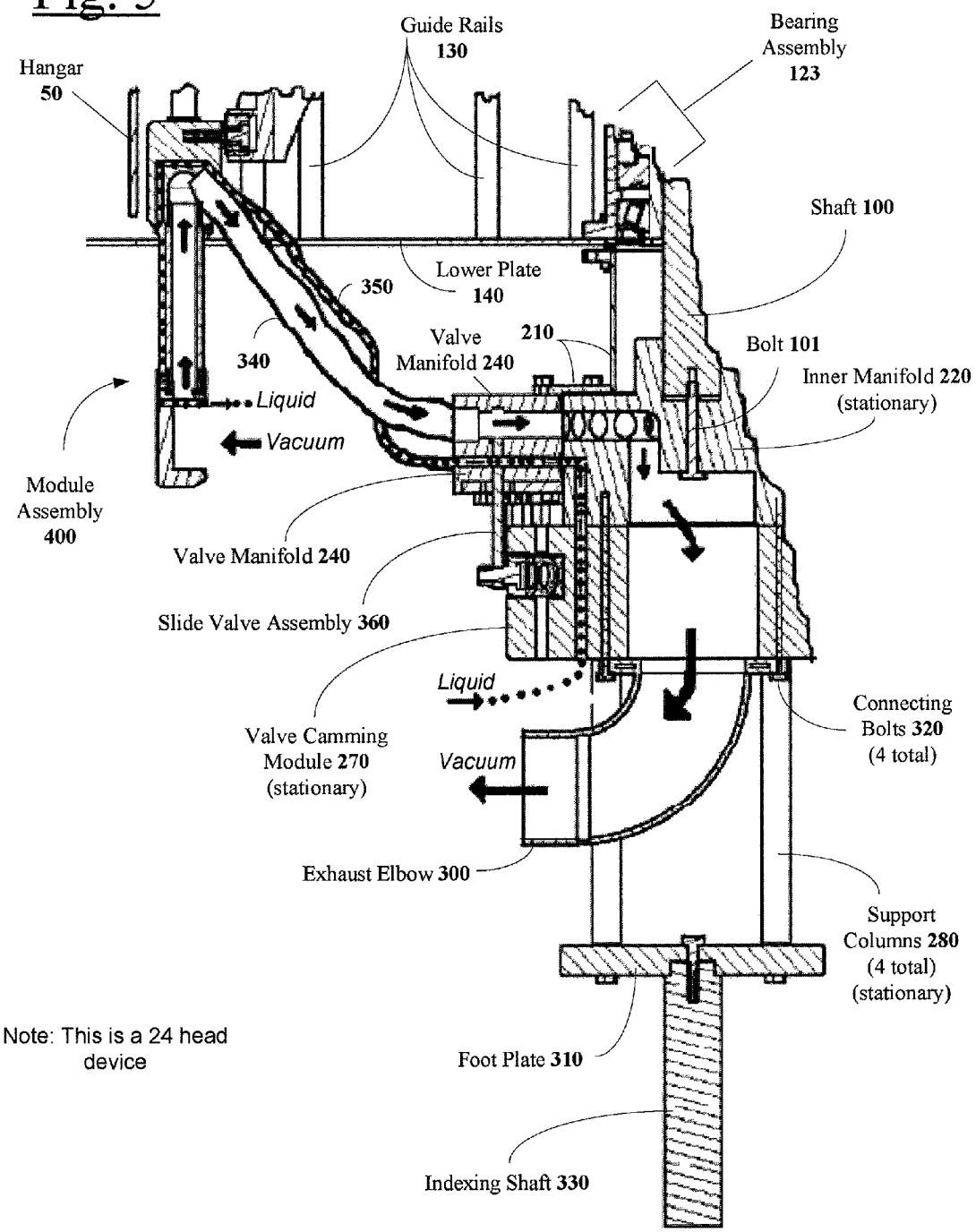
FIG. 5 is a partial view generally the same as FIG. 3 except that only certain lower elements are shown, and many of these elements are in cross-section. This view shows the paths of the vacuum and the liquid (water) from external sources to the assemblies 400.

As an example, it is shown in isolation in FIGS. 10 and 11, is shown as part of an exploded views of the lower fluid routing assembly 200 in FIG. 4, and is installed in FIGS. 3 and 5.

The general function of the inner manifold 220 is to supply the valve manifold 240 with vacuum and cleaning liquid when the valve manifold 240 needs it.

The inner manifold 200 includes the following elements and features:
Top Wall 221
Cylindrical Side Wall 222
Side Vacuum Orifice 224
Side Liquid Orifice 225
Crescent Slot 226
Boss 227
Blind Bore Hole 228
Adjustment Slot 229
Mounting Holes 231
Lower Facing Cavity 233
Liquid Entry Hole 235

The top wall 221 is solid, and supports the cylindrical boss 227 atop it. The cylindrical boss includes a blind bore hole 228 which is configured to accept the lower end of the shaft 100. An adjustment slot 229 is provided which accepts a bolt (not shown) which fixes the boss 227 relative to the shaft 100 while allowing manual adjustment therebetween.

The cylindrical side wall 222 extends downwardly from the outer edges of the top wall 221. It encloses a lower facing cavity 233, which is in continuous vacuum during normal operation of the apparatus 10.

There are two slotlike orifices in the cylindrical side wall 222, a side vacuum orifice 224 and a side liquid orifice 225. The side vacuum orifice 224 communicates within the generally cylindrical lower facing cavity 233, such the vacuum can be communicated from central bore of the valve camming drum 270. The side vacuum orifice 224 supplies vacuum when needed to the vacuum bores 242 in the valve manifold 240.

The side liquid orifice 225 communicates with liquid entry hole 235 which is in the bottom of the inner manifold 220. The side liquid orifice 225 supplies liquid under pressure when needed to the liquid bores 244 in the valve manifold 240.

The mounting holes 231 accept the ends of connecting bolts 320, which as noted elsewhere extend through the valve camming drum 270 and the exhaust elbow 300, and attach the inner manifold 200, valve camming drum 270, and exhaust elbow 300 together.

The crescent slot provides a path from the cavity 233 to the side vacuum orifice 224.

Valve Manifold 240

Valve manifold 240 in its preferred embodiment rotates at sprocket speed. Its general function is to communicate vacuum and pressurized fluid to the various module assemblies 300 at selected times. As may be understood, it communicates fluids generally; air (such as under vacuum) and liquid are both considered fluids in this application.

The valve manifold 240 includes the following elements and features:
  Vacuum Bores 242
  Liquid Bores 244
  Valve Slots 244
  Upper Mounting Holes 246
  Lower Mounting Holes 248

There are as many vacuum bores 242 as there are associated module assemblies 400. The vacuum bores 242 are each radially oriented relative to the central shaft axis and each includes an associated valve assembly 360 which selectively provides a valving function to completely or partially block the passage through the bore. These valve assemblies 360 are actuated by the valve camming drum 270 as described elsewhere. The vacuum bores 242 extend from inner ports which face the central shaft axis to outer ports which face radially from the central shaft axis. When a given inner port of a vacuum bores 242 is in line with the side vacuum orifice 224 of the inner manifold (which is in continuous vacuum), they communicate and vacuum is supplied to that inner port. This happens once per sprocket rotation. Whether or not vacuum is supplied to the module assemblies depends if the associated valve is open.

Under one preferred embodiment more than one inner port (up to four or more) of a vacuum bores 242 is in line with the side vacuum orifice 224 of the inner manifold at any given time due to the length of the orifice 224.

There are as many liquid bores 244 as there are associated module assemblies 400. The liquid bores 244 are each radially oriented relative to the central shaft axis. They are not affected by the valve assemblies 360. The liquid bores 244 extend from inner ports which face the central shaft axis to outer ports which face radially from the central shaft axis. When a given inner port of the liquid bores 244 is in line with the side liquid orifice 225 of the inner manifold (which is in continuous supply of liquid under pressure), they communicate and liquid is supplied to the inner port and on to the associated module assembly 300. This happens once per sprocket rotation.

Under one preferred embodiment more than one (up to four or more is possible) inner port of the liquid bores 244 is in line with the side liquid orifice 225 of the inner manifold at any given time due to the length of the orifice 225.

Valve slots 244 extend into the bottom side of the valve manifold 240 but not all the way through. They provide a sliding guide for the bodies of the valve assemblies 360 as described elsewhere.

Upper mounting holes 246 are in the upper surface to allow for bolts to fasten the valve manifold 240 to the flanged connecting pipe 240. As the flanged connecting pipe 240 rotates at sprocket speed, it rotates the valve manifold at sprocket speed.

Lower mounting holes 248 are in the lower surface to allow for bolts to fasten the valve manifold 240 to the valve manifold connector plate 260. As the valve manifold 240 rotates at sprocket speed, it rotates the valve manifold connector plate 260. The lower side of the valve manifold 240 is slightly recessed to accept the thickness of the valve manifold connector plate 260.

As the valve manifold 240 rotates relative to the stationary inner manifold 220 (which partially fits inside its inner bore) when the vacuum bores line up with the associated orifice in the inner manifold, vacuum communication through the associated lines is allowed to the module assemblies if the associated valves allow it. When the liquid bores line up with the associated orifice in the inner manifold, liquid communication is allowed to the module assemblies regardless of valve positions.

Valve Manifold Connector Plate 260

The valve manifold connector plate 260 is configured to provide a mounting surface for the valve assemblies 360. It is shown in two views of isolation in FIG. 16 and is shown as part of an exploded view of the lower fluid routing assembly 200 in FIG. 4. Due to its thin nature it does not show up well in the assembled views, but it should be understood as being installed within a recess in the lower surface of the valve manifold 240.

The valve manifold connector plate 260 includes valve clearance slots 261 valve mounting holes 262, and plate mounting holes 264. The valve mounting holes 262 accept fasteners to attach the valve assemblies 360 to the plate 260. Valve clearance slots 261 allow clearance for the valve bodies. Plate mounting holes 264 accept fasteners to attach the plate 260 to the underside of the valve manifold 240. The valve manifold connector plate 260 rotates with the valve manifold 240 at sprocket speed.

Valve Camming Drum 270

The valve camming drum 270 is shown in various views of isolation in FIGS. 17-18 and is shown as part of an exploded view of the lower fluid routing assembly 200 in FIG. 4. It is shown in installed in for example FIGS. 3 and 5.

The valve camming drum 270 provides a cam feature to activate the slide valve assemblies 360.

The valve camming drum 270 is supported on its underside by the four support columns 280. It has bolted to its underside the exhaust elbow 300. It supports the inner manifold 220. It has a channel 276 which is defined in its outer circumferential side which is defined on top by an upper camming rail 272 and on bottom by a lower camming rail 274. Column mounts 277 (counter bored holes) allow for mounting to the upper ends of the support columns 280.

Thru slots 278 accept connecting bolts 120 which as noted elsewhere extend through the valve camming drum 270 and the exhaust elbow 300, and attach the inner manifold 200, valve camming drum 270, and exhaust elbow 300 together. This is to allow for adjustment.

A liquid inlet hole 271 is configured to supply liquid to a through passageway that has the liquid inlet hole as its entry and the liquid outlet slot as is outlet. The liquid outlet slot 273 communicates with the liquid entry hole 235 of the inner manifold, and supplies cleaning liquid thereto. The liquid can be water or an anti-microbial solution.

As noted above the valve camming drum 270 provides a cam feature to activate the slide valve assemblies 360. In particular it causes the cam followers 369 of the valve assemblies 360 to move up and down as they move within its channel 276, causing the valves bodies to slide up and down and close or open their associated vacuum passageways.

Support Columns 280

The support columns 280 (see FIGS. 2, 3, 4 and 5, for example) are elongate and rigid, and connect the foot plate 310 to the valve camming drum 270. They support the valve camming drum 270. Four are used in the example shown.

Exhaust Elbow 300

The exhaust elbow 300 (see FIGS. 2, 3, 4 and 5, for example) supplies suction from an external source such as known in the art, and allow for the passage therethrough and removal of organs and the like removed by the module assemblies 400 of the apparatus 100.

Foot Plate 310

The floor plate 310 is attached to the bottom of the support columns 280. It is supported by indexing shaft 330.

Connecting Bolts 320

Connecting bolts 320 extend upwardly through the mounting flange of the exhaust elbow 300, then through the valve camming drum 270 and then engage the inner manifold 200, thus fixing the inner manifold 200, valve camming drum 270, and exhaust elbow 300 together. They are shown in several views but numbers in FIGS. 4 and 5.

Indexing Shaft 330

Indexing shaft can be raised and lowered to allow for the entire device to be lowered away for cleaning, by a known means of lifting such as by hydraulic or manual jacking as known in the art. Minor lifting or lower adjustments can also be provided to accommodate bird size. Smaller bird moves up, larger bird moves down.

Vacuum Hoses 340

There are as many vacuum hoses 340 as there are associated module assemblies 400. Vacuum hoses 340 communicate vacuum between corresponding vacuum bores 242 of the valve manifold 240 and the vacuum orifices 414 of the module assemblies 400. They are flexible to accommodate up-and-down indexing of the modules 400 and can be made of ribbed rubber hose or other suitable materials.

Cleaning/Flushing Liquid Hoses 350

There are as many cleaning liquid hoses 350 as there are associated module assemblies 400. Cleaning liquid hoses 350 communicate vacuum between corresponding liquid bores 244 of the valve manifold 244 and the liquid intake orifices 416 of the module assemblies 400.

Slide Valve Assemblies 360

There are as many slide valve assemblies 360 as there are associated module assemblies 400. Slide valve assemblies 360 are configured to provide selective vacuum to their corresponding module assemblies 400. They are mounted relative to the valve manifold 240 but are actuated by the valve camming module 270.

Figure 2:
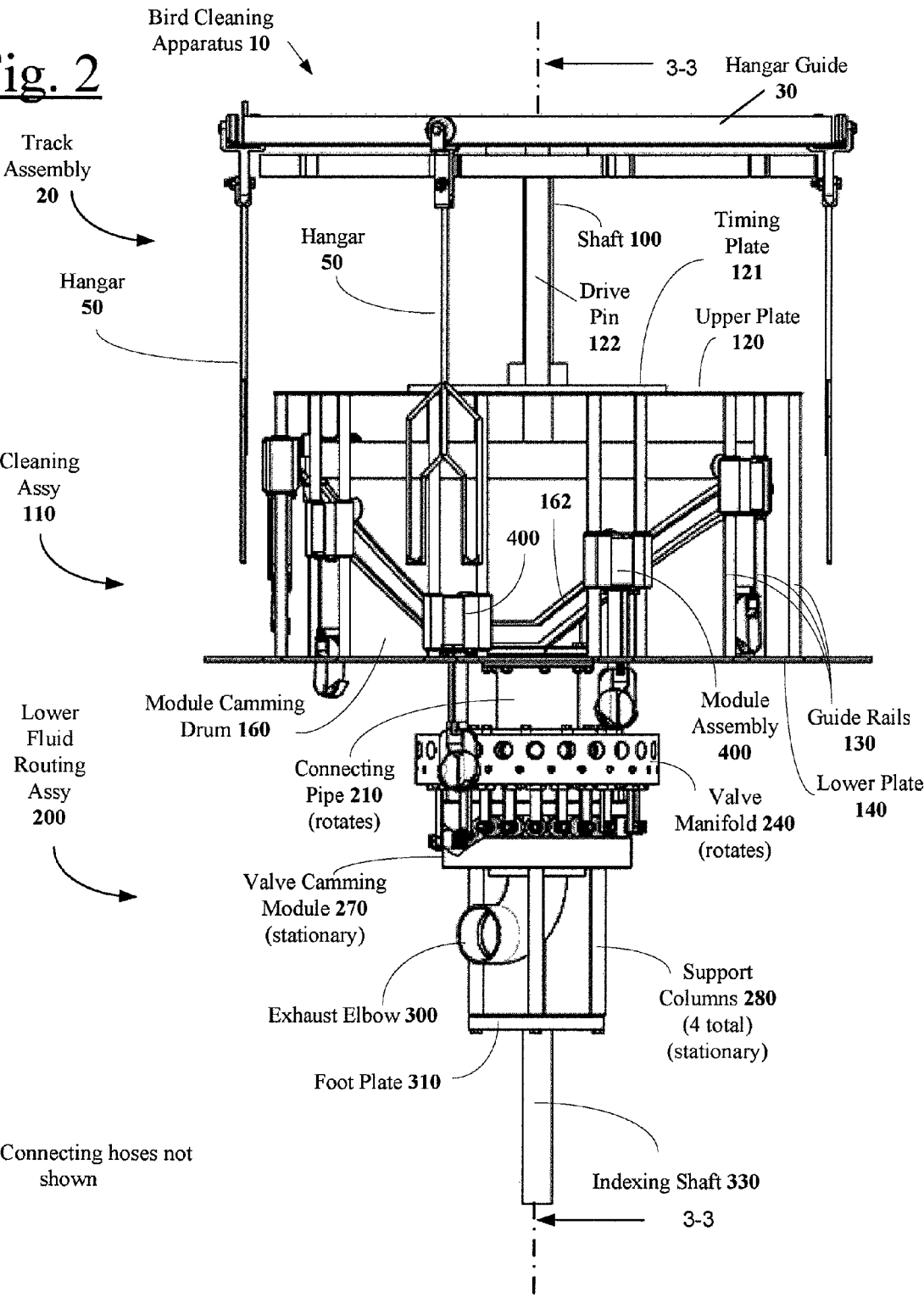
FIG. 2 is a view of the apparatus shown in FIG. 1, except that this is a side plan elevational view. It should be understood that this view does not show various connecting hoses which supply cleaning liquid and vacuum to the module assemblies 400.

A slide valve assembly 360 is shown in isolation in FIGS. 21 and 22, and installed in FIGS. 3 and 5. A plurality are shown in FIGS. 2, 6 and 30.

The slide valve assemblies 360 include the following elements and features:

Valve Body 362
Slide Rod Mount 364
Bolts 365
Seal 366
Slide Valve Cam Follower 369

The valve body 362 slides up and down to provide the valving of the associated vacuum bores 242 in the valve manifold 240. The cam follower 369 is rotatably mounted relative to the valve body 362. The slide rod mount 364 is mounted to the manifold connector plate 260 by bolts 365.

The slide valve assemblies 360 are configured to be installed such that all the cam followers 369 of all the slide valve assemblies 360 are within the channel 276 of the valve camming module 270 as shown in FIGS. 2, 6 and 30. As the channel moves up and down relative to the slide rod mount 364, the valve body goes up and down and valving is caused.

Path of the Vacuum

The communication line providing vacuum from an external source to the module assemblies is now generally described. In reference to FIG. 5, the path of materials being withdrawn from within the birds will be described to illustrate the communication line of the vacuum. Beginning at the module assemblies 400, the material enters the lower ends of the module assemblies, goes up through the downtube and end along the vacuum line 340, into the valve manifold 240. (Assuming the valve in that line is open.) Material continues into the inner manifold 220, downwardly into the valve camming module 270, and out through the exhaust elbow 300.

Path of the Flushing Liquid

Cleaning liquid is supplied under pressure (which can be water) into the underside of the valve camming module 270, generally vertically upwardly into the inner manifold 220, then turns approximately 90 degrees outwardly and radially towards and into the valve manifold 240, into a liquid line 350, into the upper portion of the module assembly, whereupon it then passes downwardly down the outside of the module assembly 400 (relative to the shaft), then finally makes another 90 degree turn inwardly, and exits underneath the vacuum intake ports.

Module Assemblies 400

A plurality of module assemblies 400 are preferably disposed symmetrically about cleaning assembly 110.

Each module assembly 400 includes the following elements and features:

Sliding Block 410
   Bushings 412 (4)
   Vacuum Orifice 414
   Liquid Intake Orifice 416
Cam Roller 420
Down Tube 430
Liquid Connection Tube 435
Flush and Vacuum Head 440
   Scrub Elements 442
   Vacuum Orifices 444 (2)
   Liquid Exit orifice 416

The sliding block 410 slides up and down relative to the guide rails 130. The sliding block 410 includes bushing 412, a vacuum orifice 414, and a liquid intake orifice 416. Vacuum is supplied to the vacuum orifice 414 of the sliding block 410 by vacuum hoses 340. Cleaning liquid is supplied to the liquid intake orifice 416 by a corresponding cleaning liquid supply hose 350. (FIG. 5). The cam roller 420 fits within the channel 276 of the valve camming drum 270, and is indexed up and down thereby, as the drum 270 rotates. The down tube 430 extends rigidly downwardly from the sliding block 410, and provides a vacuum passageway. A liquid connection tube 435 extends rigidly relative to the sliding block generally parallel to the down tube 430.

A flush and vacuum head 440 attaches to the lower ends of the down tube 430 and the liquid connection tube 435, and receives vacuum, and liquid from the down tube 430 and the liquid connection tube 435, respectively. The flush and vacuum head 440 includes scrub elements 442 (which are flexible rubber, urethane, or the like), vacuum orifices 444, and a liquid exit orifice 416. Liquid exits the liquid exit orifice 416, and provides lubrication within the cavity as suction is being applied by the module assembly, which has been found to be an important feature of one of the present inventions. There are two vacuum orifices 440, which merge immediately within the flush and vacuum head 440. It may be seen that these two orifices correspond generally to the elongate/two-lung configuration of conventional poultry.

Module Assembly 500 (FIGS. 31-36)

180 degree concept

It should be noted that module assemblies 400 and 500 are interchangeable for purposes of this discussion.

In the poultry processing industry there are two styles of hangars (shackles) used to convey poultry through the process of slaughter. One type is what is commonly referred to as a straight shackle. This style of shackle has loops that are straight and vertical in orientation, in the loops the tarsal joint of the poultry are placed. The other type of hangar is commonly referred to as a two piece shackle. This style has a vertical top section with a joint above the loops, the loops are made horizontal at the bottom of this assembly, the horizontal loops protrude a short distance to accommodate the tarsal joint and provide better manipulation of poultry as they are being processed in machinery.

With the straight shackle it is best to have the breast side of the poultry face inward toward the central axis of the processing machine. This is due to how the tarsal joint is positioned as broken hocks can result if breast is facing outwardly away from the central shaft of the processing machine.

With the two piece shackle it is advantageous to have the breast of the poultry face away from the central axis of the processing machine. The horizontal loops are also position in the direction of the breast. This provides for better cavity access of the poultry.

Therefore there is a need for a lung removal (cleaning) machine to have a module that has a vacuum (suction) head that can be easily changed for the type of hangar being used in the processing of poultry. The Module assembly 500 as shown in FIGS. 31-46 consist of the following a sliding Block 510 that contains vacuum orifices 514, liquid orifice 516, to which is connected cam roller assembly 520 to which is connected mounting screws 518 to which is connected bushings 512 through which guide rails pass through, to which (4) down tube 530 (vacuum tube) at its top portion has a flange a distance from its top end.

This tube 530 is positioned through swivel seal retainer 532 (with a hole for the liquid conduit) that forms an axial channel with an exit hole for the acceptance of liquid conduit 535. This channel is surrounded by a means of sealing. In the axial channel the exit is positioned in the bottom of the channel. The exit runs parallel with down tube 530 and liquid conduit 535. In this exit, liquid conduit 535 is connected; liquid conduit 535 is connected to a central union 538 this forms a continuous conduit for liquid from sliding block 510 to central union 538 at which point the liquid exits. Retaining set screws 539 fasten liquid conduit 535 and down tube 530. Flush and vacuum head segments 540 (2 in the embodiment shown) are connected with central union 538. Slotted male intake fitting 542 connects with central union 538 between which a means of sealing is positioned. Slotted male intake fitting 542 is fastened by retaining set screws 539.

Segment body 541 has a slot 544 and central union 538 has a slot (not shown) that urethane spring 550 connects to. This forms a spring to provide a reciprocal movement about an axis formed by slotted male intake fitting 542 and central union 538 apply pressure to the cavity walls of the bird 5 as seen in FIG. 6.

Dislodger 545 (which is flexible rubber, urethane, or the like), is connected to segment body 541 by slide tab 551 and snap tab 452. Dislodger 545 functions to dislodge lungs and elements on the cavity wall of the bird 5 as it moves in and out of the cavity of the bird the dislodger is flexible. As module assembly 500 moves up dislodger 545 moves up the flexibility of the dislodger conforms to the irregular shape of the cavity of the bird. It also maintains reciprocal element from the nature of its flexibility. Liquid is caused to be passed through the module 500 into the cavity of the bird, this provides for vehicle of encapsulation of dislodged waste to be transported from the cavity of the bird into suction inlet opening 546 intakes waste material such as lungs and residual displaced tissue from previous process that have been left in the cavity of the bird ultimately being transferred as is the case in module 400: to the exhaust elbow 300 and out.

Alternate Module "Jog" Embodiment

Reference is now made to FIG. 30 to show an embodiment of the invention which provides a "jogging" of the module up and down while they are in the cavity. This feature allows for improve action of the modules. As may be seen, in the embodiment shown the module jogs up and down four times from its down most position before it finally is withdrawn.

Various Advantages

The configuration of the valves according to the present invention provides for a "surge" or "pulse" in vacuum, which is an advantage of the present invention. This surge or pulse prevents clogging, and allows for a buildup of vacuum by partially or completely closing the vacuum supply lines to the modules at varying stages through the field of engagement of the modules in the birds. This is not only provided by the general operation of the valves, but also by the "jogging" feature of the valves while the module is in the bird.

The provision of cleaning or flushing fluid is another advantage provided herein. The addition of a liquid in the bird cavity provides improved suction action.

The provision of the reversible lower portion of the modules 500 is another advantage. This allows for easy reversal to accommodate line changes.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

APPENDIX

Element List

5 Poultry element ("bird")
Bird Cleaning Apparatus 10
20 track assembly
   hangar guide 30
   sprocket wheel 40
      sprocket hub bearing assembly 41
   hangars 50
      loops 60
100 shaft
110 cleaning assembly

| | |
|---|---|
| upper plate 120 | (rotate with sprocket about central shaft axis) |
| upper plate bearing assy 123 | |
| Timing plate 121 | (rotate with sprocket about central shaft axis) |
| Drive pins 122 | (rotate with sprocket about central shaft axis) |
| guide rails 130 (x320) | (rotate with sprocket about central shaft axis) |
| lower plate 140 (x200) | (rotate with sprocket about central shaft axis) |
| loop openings 142 ( | |
| lower plate bearing assy 143 | |
| Module Camming Drum 160 | (stationary) |
| Upper Camming Rails 162 | |
| Lower camming Rails 164 | |
| Cam Channel 166 | |

Lower Fluid Routing Assembly 200
  Flanged Connecting Pipe 210
    Body 212
    Upper Flange 213
    Lower Flange 214
  Inner manifold 220
    Top Wall 221
    Cylindrical Side Wall 222
    Side Vacuum Orifice 224
    Side Liquid Orifice 225
    Crescent Slot 226
    Boss 227
    Blind Bore Hole 228
    Adjustment Slot 229
    Mounting Holes 231
    Lower Facing Cavity 233
    Liquid Entry Hole 235
  Valve Manifold 240
    Vacuum Bores 242
    Liquid Bores 244
    Valve Slots 244
    Upper Mounting Holes 246
    Lower Mounting Holes 248
  Valve Manifold Connector Plate 260
    Valve Clearance Slots 261
  Valve Mounting Holes 262
    Plate Mounting Holes 264
  Valve Camming Drum 270
    Upper Camming Rail 272
    Lower Camming Rail 274
    Channel 276
    Column Mounts 277
    Column Mount Bolt Thru Holes 278
    Thru Slots 279
    Liquid inlet hole 271
    Liquid outlet slot 273
  Support Columns 280
  Exhaust Elbow 300
  Foot Plate 310
    Foot plate bolts 312
  Connecting Bolts 320
  Indexing Shaft 330
  Vacuum Hoses 340
  Cleaning Liquid Hoses 350
  Slide Valve Assemblies 360
    Valve Body 362
    Slide Rod Mount 364
    Bolts 365
    Seal 366
    Slide Valve Cam Follower 369
400 Module Assembly
  Sliding Block 410
    Bushings 412
    Vacuum Orifice 414
    Liquid intake orifice 416
  Cam Roller 420
  Down Tube 430
  Liquid Connection Tube 435
  Flush and Vacuum Head 440
    Scrub Elements 442
    Vacuum Orifices 444
    Liquid Exit Orifice 446
Module Assembly 500
  Sliding Block 510
    Bushings 512 (4)
    Vacuum Orifices 514
    Liquid Orifice 516
    Mounting Screws 518
  Cam Roller Assembly 520
  Down Tube 530
  Swivel Seal Retainer 532 (with hole for conduit)
  Liquid Conduit 535
  Central Union 538
    Retaining Set Screws 539
  Flush and Vacuum Head Segments 540 (2)
    Segment body 541
    Slotted male intake fitting 542 (fits into union)
    Slot 544 (accepts one end of 550)
    Dislodger 545
    Suction inlet opening 546 (intakes waste material)
  Urethane Spring 550
    Slide tab 551
    Snap tab 452

That which is claimed:

1. A poultry processing method of withdrawing organs from the interior of the upwardly directed chest cavities of a plurality of birds being conveyed on hangars, said method comprising the steps of:
   A) conveying said birds along a path;
   B) for each one of said plurality of birds, inserting an elongate cleaning module portion downwardly into said chest cavity of said one bird, said cleaning module portion including a fluid supply port in communication with a pressurized liquid and a vacuum cavity in communication with a vacuum source;
   C) dispensing liquid from said fluid supply port into the chest cavity of said one bird;
   D) withdrawing an organ portion from the chest cavity of said one bird through said vacuum cavity along with said liquid with the assistance of said communicated vacuum; and
   E) withdrawing said elongate cleaning module portion.

2. The method of claim 1, wherein step C at least partially overlaps step D.

3. The method of claim 2, wherein during step D, said cleaning module portion is indexed up and then down from a predetermined down position.

4. The method of claim 1, wherein during step D, said cleaning module portion is indexed up and then down from a predetermined down position.

5. The method of claim 4, wherein during step D also includes at least partially deactivating and reactivating said vacuum while said elongate cleaning module portion is still in said chest cavity of said one bird.

6. The method of claim 1, wherein during step D also includes at least partially deactivating and reactivating said vacuum while said elongate cleaning module portion is still in said chest cavity of said one bird.

7. A poultry processing method of withdrawing organs from the interior of the upwardly directed chest cavities of a plurality of birds being conveyed on hangars, said method comprising the steps of:
   A) conveying said birds along a path;
   B) for each one of said plurality of birds, inserting the lower portion of an elongate cleaning module portion downwardly into said chest cavity of said one bird, said cleaning module portion including a vacuum cavity in communication with a vacuum source, said vacuum source being capable of being selectively activated and deactivated;
   C) withdrawing a first organ portion from the chest cavity of said one bird through said vacuum cavity with the assistance of said communicated vacuum while said vacuum is activated;
   D) at least partially deactivating and reactivating said vacuum while said elongate cleaning module portion is still in said chest cavity of said one bird;
   E) subsequent to Step "D", withdrawing a second organ portion from the chest cavity of said one bird through said vacuum cavity with the assistance of said communicated vacuum; and
   D) withdrawing said elongate cleaning module portion from said chest cavity of said one bird.

8. The method of claim 7, wherein during at least one of steps C and E, fluid is transferred from said lower portion of an elongate cleaning module portion into said bird cavity.

9. The method of claim 7, wherein during the period including steps C and E, fluid is transferred from said lower portion of an elongate cleaning module portion into said bird cavity.

10. The method of claim 7, wherein during the period including steps C and E, said cleaning module portion is indexed up and then down from a predetermined down position to perform a "jogging" action.

11. A poultry processing apparatus for withdrawing organs from the interior of the chest cavities of birds being sequentially conveyed along a processing path on hangars attached to a hangar chain driving a hangar chain sprocket rotating about an axis, said apparatus including:
   a base frame;
   a valve camming module above and attached relative to frame;
   an inner manifold above and attached relative to valve camming module;
   an elongate shaft extending generally vertically above and having its lower end attached relative to said inner manifold, said shaft having a central shaft axis substantially parallel to said chain sprocket axis;
   a cleaning module camming drum fixed relative to said elongate shaft and including a nonlinear cam channel;
   a valve manifold rotatably mounted relative to said inner manifold generally about said central shaft axis, said valve manifold including a plurality of fluid ports;
   a slide bar cage assembly including a plurality of substantially parallel slide bars, said slide bar cage assembly above and attached relative to said valve manifold such that said slide bar cage assembly and said valve manifold can rotate together about said central shaft axis;
   a drive connection between said slide bar cage assembly and said hangar chain sprocket such that said hangar chain sprocket, said slide bar cage assembly, and said valve manifold rotate at the same rotational speed;
   a plurality of cleaning modules configured to index up and down on corresponding ones of said slide bars in response to engagement with said cam channel such that a lower portion of each of said cleaning modules can be partially placed within the chest cavity of a corresponding bird; and
   fluid connection lines intermediate said fluid ports of said valve manifold and said cleaning modules such that fluid communication is possible between said lower portion of each of said cleaning modules and the chest cavity of a corresponding bird during rotation of said hangar chain sprocket.

12. The apparatus of claim 11 wherein said fluid connection lines are vacuum lines wherein said fluid is air drawn into said valve manifold by vacuum and said cleaning modules withdraw bird portions from within said bird cavities.

13. The apparatus of claim 11 wherein said fluid connection lines are fluid lines wherein said fluid is liquid exiting said valve manifold under pressure to eventually be inserted into said bird cavities.

14. The apparatus of claim 11 wherein said cleaning modules include two lower head portions which can pivot relative to each other and each include a corresponding flexible scrubbing member.

15. A poultry processing method of withdrawing organs from the interior of the upwardly directed chest cavities of a plurality of birds being conveyed on hangars, said method comprising the steps of:
   A) providing a cleaning module assembly itself including:
   1) a sliding block configured to index up and down such that the module goes partially in and out of a bird cavity;
   2) an elongate down tube rigidly extending downwardly from said sliding block but being selectively rotatable relative to said sliding block about its longitudinal central axis; and
   3) a fluid transfer head for being placed in one of said chest cavities, said head attached to said down tube;
   B) processing a first plurality of birds with said elongate down tube in a first position;
   C) rotating said elongate down tube to a second rotated position being substantially 180 degrees rotated about said longitudinal axis relative to said first position; and
   D) processing a second plurality of birds with said elongate down tube to a second rotated position, such that the orientation of said fluid transfer head is reversed 180 relative to its position during step "B".

16. A poultry processing cleaning module assembly including:
1) a sliding block configured to index up and down such that the module goes partially in and out of a bird cavity;
2) an elongate down tube rigidly extending downwardly from said sliding block; and
3) a fluid transfer head for being placed in one of said chest cavities, said head attached to said down tube and including at least vacuum orifices, each orifice having a plurality of replaceable scrub elements mounted about its periphery.

17. A poultry processing cleaning module assembly for use with a bird having a cavity, said module including:
1) a sliding block configured to index up and down such that the module goes partially in and out of a bird cavity;
2) an elongate down tube rigidly extending downwardly from said sliding block; and
3) a fluid transfer head including two separate segments movable relative to each other and said down tube.

18. The cleaning module as claimed in claim 17, wherein each of said segments includes a flexible dislodger attached thereto dislodge lungs and elements on the cavity wall of the bird as it moves in and out of the cavity of the bird.

19. The cleaning module as claimed in claim 18, further comprising a spring intermediate said segments.

20. The cleaning module as claimed in claim 17, further comprising a spring intermediate said segments.

21. The cleaning module as claimed in claim 17, wherein said two separate segments movable relative to each other and said down tube are each pivotable about an axis substantially perpendicular to the longitudinal axis of said elongate down tube.

* * * * *